United States Patent Office 3,431,111
Patented Mar. 4, 1969

3,431,111
CYANINE DYES
Leslie G. S. Brooker and Earl J. Van Lare, Rochester, N.Y., assignors to Eastman Kodak Company, Rochester, N.Y., a corporation of New Jersey
No Drawing. Continuation-in-part of application 573,183, Aug. 18, 1966. This application Jan. 17, 1967, Ser. No. 609,791
U.S. Cl. 96—106  23 Claims
Int. Cl. G03c 1/10

ABSTRACT OF THE DISCLOSURE

Cyanine dyes are provided which feature an imidazo-[4,5-b]quinoxaline nucleus. Light sensitive emulsions containing such dyes are also provided.

---

This application is a continuation-in-part of our copending application Ser. No. 573,183, filed Aug. 18, 1966, and now abandoned, which is a continuation-in-part of our copending application Ser. No. 286,469, filed June 10, 1963, and now abandoned.

This invention relates to polymethine dyes, and more particularly to new cyanine dyes, intermediates and methods for preparing these new dyes, to photographic emulsions containing these dyes, and to the use of these dyes as bleachable filter dyes and as biological stains.

It is, accordingly, an object of the invention to provide a new class of polymethine dyes that function as desensitizers or light absorbing dyes for photographic elements. Another object is to provide a new class of chemical intermediates from which these new dyes can be derived. Another object is to provide photographic silver halide emulsions containing these new dye compounds as desensitizers. Another object is to provide methods for preparing these new compounds and photographic materials thereof. Other objects will become opparent hereinafter from a consideration of the description and examples.

In accordance with one embodiment of this invention, cyanine dyes are provided which contain an imidazo [4,5-b]-quinoxaline salt moiety.

In another embodiment of this invention, cyanine dye salts are provided which comprise two nuclei joined together by methine linkage, one of the nuclei being an imidazo[4,5-b]quinoxaline nucleus, which is joined through the 2-carbon atom thereof to the methine linkage, and a second nucleus to complete the cyanine dye. Advantageously, the second nucleus of such dyes contains a heterocyclic nitrogen atom, and the methine linkage is part of a polyene chain containing an equal number of alternating single and double bonds, one terminal carbon atom of the polyene chain being the 2-carbon atom of an imidazo[4,5-b]quinoxaline nucleus, the other terminal carbon atom of the polyene chain being in the second nucleus and attached to the heterocyclic nitrogen atom. Preferably, the second nucleus in these dyes is a desensitizing nucleus. As used herein and in the appended claims, "desensitizing nucleus" refers to those nuclei which, when converted to a symmetrical carbocyanine dye and added to a gelatin silver chlorobromide emulsion containing 40 mole percent chloride and 60 mole percent bromide, at a concentration of from 0.01 to 0.2 gram dye per mole of silver, cause, by electron trapping, at least an 80% loss in the blue speed of the emulsion when it is sensitometrically exposed and developed 3 minutes at 20° C. in Kodak developer D–19. Preferably, the desensitizing nuclei are those which, when converted to a symmetrical carbocyanine dye and tested as just described, essentially completely desensitize the test emulsion to blue radiation. Substantially complete desensitization as used herein refers to nuclei which, when tested as described above, result in at least about a 90%, and preferably more than a 95%, loss of speed to blue radiation. Nitro-substituted heterocyclic nuclei of the type used in cyanine dyes are typical desensitizing nuclei.

In another embodiment of the invention, merocyanine dyes are provided comprising two nuclei joined together through an acyclic methine group which is part of a polyene chain containing an equal number of alternating single and double bonds, one of the terminal atoms of the polyene chain being the 2-carbon atom of an imidazo [4,5-b]quinoxaline nucleus, and the other terminal carbon atom of the polyene chain being in a second heterocyclic ring and attached to on extracyclic carbonylic oxygen atom.

In still another embodiment of this invention, styryl dyes are provided comprising an imidazo[4,5-b]quinoxaline nucleus joined to a para-alkylamino benzene ring through an acyclic polyene chain containing an equal number of single and double bonds, one terminal atom of the polyene chain being the 2-carbon atom of said imidazo[4,5-b]quinoxaline nucleus, the other terminal carbon atom being in the benzene ring and attached to the nitrogen atom of the para-aminoalkyl group.

In a further embodiment of this invention, cyanine dyes are provided comprising two imidazo[4,5-b]quinoxaline nuclei joined together through a polyene chain containing an equal number of alternating single and double bonds, the terminal carbon atoms of the polyene chain being the 2-carbon atoms, respectively, of the imidazo [4,5-b]quinoxaline nuclei. Preferably, the polyene chain of these dyes is composed of five carbon atoms.

The new dyes of the invention include those represented by the following general formulas:

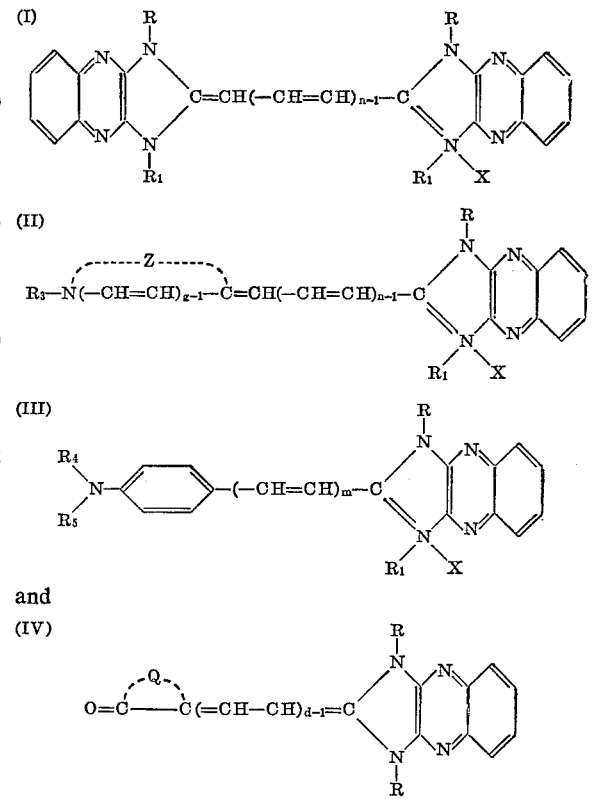

wherein $n$ represents a positive integer of from 1 to 4, $m$ and $g$ each represents a positive integer of from 1 to 2, $d$ represents a positive integer of from 1 to 3, R and $R_1$ each represents a substituent independently selected from the group consisting of an acyclic hydrocarbon substituent, such as an alkyl group (including substituted alkyl), preferably containing from 1 to 18 carbon atoms, e.g., methyl, ethyl, propyl, isopropyl, butyl, sec-butyl, hexyl, cyclohexyl, dodecyl, octadecyl, hydroxyalkyl (e.g. β-hydroxyethyl, γ-hydroxypropyl, etc.), and alkenyl substituents, such as allyl, 1-propenyl, 2-propenyl, 1-butenyl, 2-butenyl and 3-butenyl, etc.; alkaryl substituents such as benzyl and β-phenylethyl; and aryl substituents, e.g., phenyl, p-tolyl, o-tolyl, 3,4-dichlorophenyl, etc., groups; $R_3$ represents an alkyl group of from 1–12 carbon atoms, e.g., methyl, γ-sulfopropyl, isopropyl, butyl, sec-butyl, ω-sulfobutyl, dodecyl, β-hydroxyethyl, γ-hydroxypropyl, β-methoxyethyl, β-ethoxyethyl, allyl, benzyl, β-phenylethyl, β-carboxyethyl, carboxymethyl, γ-carboxypropyl, β-acetoxyethyl, γ-acetoxypropyl, carbomethoxyethyl, carboxyethoxyethyl, etc., groups; $R_4$ and $R_5$ each represents the same or different alkyl group of from 1–6 carbon atoms, e.g., methyl, ethyl, 2-cyanoethyl, propyl, isopropyl, butyl, hexyl, etc., groups, X represents an acid ion, e.g., chloride, bromide, iodide, thiocyanate, sulfamate, methyl sulfate, ethyl sulfate, perchlorate, p-toluenesulfonate, etc., Z represents the non-metallic atoms required to complete a heterocyclic nucleus containing from 5 to 6 atoms in the heterocyclic ring, which may also include, in addition to the hetero nitrogen atom, a second hetero atom such as an oxygen atom, a sulfur atom, a selenium atom, or a second nitrogen atom, such as the atoms required to complete a thiazole nucleus (e.g., thiazole, 4-methylthiazole, 4-phenyl-thiazole, 5-methylthiazole, 5-phenylthiazole, 4,5-dimethylthiazole, 4,5-diphenylthiazole, 4-(2-thienyl)thiazole, etc.); a benzothiazole nucleus (e.g., benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, etc.); a naphthothiazole nucleus (e.g., α-naphthothiazole, β-naphthothiazole, 5-methoxy-β-naphthothiazole, 5-ethoxy-β-naphthothiazole, 8-methoxy-α-naphthothiazole, 7-methoxy-α-naphthothiazole, etc.); a thianaphtheno-7',6', 4,5-thiazole nucleus (e.g., 4'-methoxythianaphtheno-7',6', 4,5-thiazole, etc); an oxazole nucleus (e.g., 4-methyloxazole, 5- methyloxazole, 4-phenyloxazole, 4,5-diphenyloxazole, 4-ethyloxazole, 4,5-dimethyloxazole, 5-phenyloxazole, etc.); a benzoxazole nucleus (e.g., benzoxazole, 5-chlorobenzoxazole, 5-methylbenzoxazole, 5-phenylbenzoxazole, 6-methylbenzoxazole, 5,6-dimethylbenzoxazole, 4, 6-dimethylbenzoxazole, 5-methoxybenzoxazole, 5-ethoxybenzoxazole, 6-chlorobenzoxazole, 6-methoxybenzoxazole, 5-hydroxybenzoxazole, 6-hydroxybenzoxazole, etc.); a naphthoxazole nucleus (e.g., α-naphthoxazole, β-naphthoxazole, etc.); a selenazole nucleus (e.g., 4-methylselenazole, 4-phenylselenazole, etc.); a benzoselenazole nucleus (e.g., benzoselenazole, 5-chlorobenzoselenazole, 5-methoxybenzoselenazole, 5-hydroxybenzoselenazole, tetrahydrobenzoselenazole, etc.); a naphthoselenazole nucleus (e.g., α-naphthoselenazole, β-naphthoselenazole, etc.); a thiazoline nucleus (e.g., thiazoline, 4-methylthiazoline, etc.); a 2-quinoline nucleus (e.g., quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline, etc.); a 4-quinoline nucleus (e.g., quinoline, 6-methoxyquinoline, 7-methylquinoline, 8-methylquinoline, etc.); a 1-isoquinoline nucleus (e.g., isoquinoline, 3,4-dihydroisoquinoline, etc.); a 3-isoquinoline nucleus (e.g., isoquinoline, etc.); a 3,3-dialkylindolenine nucleus (e.g., 3,3-dimethylindolenine, 3,3,5-trimethylindolenine, 3,3,7-trimethylindolenine, etc.); a 2-pyridine nucleus (e.g., pyridine, 3-methylpyridine, 4-methylpyridine, 5-methylpyridine, 3,4-dimethylpyridine, 4-chloropyridine, 3-hydroxypyridine, 3-phenylpyridine, etc.); a 4-pyridine nucleus (e.g., 2-methylpyridine, 3-methylpyridine, 3-chloropyridine, 2,6-dimethylpyridine, 3-hydroxypyridine, etc.); a 1-alkylimidazole nucleus (e.g., 1-methylimidazole, 1-ethyl-4-phenylimidazole, 1-butyl-4,5-dimethylimidazole, etc.); a 1-alkylbenzimidazole nucleus (e.g., 1-methylbenzimidazole, 1-butyl-4-methylbenzimidazole, 1-ethyl-5,6-dichlorobenzimidazole, etc.); and a 1-alkyl-naphthimidazole nucleus (e.g., 1-ethyl-α-naphthimidazole, 1-methyl-β-naphthimidazole, etc.); and, Q represents the non-metallic atoms required to complete a 5 to 6 membered heterocyclic nucleus, typically containing a hetero atom selected from nitrogen, sulfur, selenium, and oxygen, such as a 2-pyrazolin-5-one nucleus (e.g., 3-methyl-1-phenyl-2-pyrazolin-5-one, 1-phenyl-2-pyrazolin-5-one, 1-(2-benzothiazolyl)-3-methyl-2-pyrazolin - 5-one, etc.); an isoxazolone nucleus (e.g., 3-phenyl-5(4H)-isoxazolone, 3-methyl-5-(4H)-isoxazolone, etc.); an oxindole nucleus (e.g., 1-alkyl-2,3-dihydro-2-oxindoles, etc.), a 2,4,6-triketohexahydropyrimidine nucleus (e.g., barbituric acid or 2-thiobarbituric acid as well as their 1-alkyl (e.g., 1-methyl-1-ethyl, 1-propyl, 1-heptyl, etc.) or 1,3-dialkyl (e.g., 1,3-dimethyl, 1,3-diethyl, 1,3-dipropyl, 1,3-diisopropyl, 1,3-dicyclohexyl, 1,3-di(β-methoxyethyl), etc., or 1,3-diaryl (e.g., 1,3-diphenyl, 1,3-di(p-chlorophenyl), 1,3-di(p-ethoxycarbonylphenyl), etc.), or 1-aryl (e.g., 1-phenyl, 1-p-chlorophenyl, 1-p-ethoxycarbonylphenyl), etc. or 1-alkyl-3-aryl (e.g., 1-ethyl-3-phenyl, 1-n-heptyl-3-phenyl, etc.) derivatives); a rhodanine nucleus (i.e., 2-thio-2,4-thiazolidinedione series), such as rhodanine, 3-alkylrhodanines (e.g., 3-ethylrhodanine, 3-allylrhodanine, etc.), 3-carboxyalkylrhodanines (e.g., 3-(2-carboxyethyl) rhodanine, 3-(4-carboxybutyl)rhodanine, etc.), 3-sulfoalkylrhodanines (e.g., 3-(2-sulfoethyl)rhodanine, 3-(3-sulfopropyl)rhodanine, 3-(4-sulfobutyl)rhodanine, etc.), or 3-arylrhodanines (e.g., 3-phenylrhodanine, etc.), etc.; a 2(3H)-imidazo-[1,2-a]-pyridone nucleus; a 5,7-dioxo-6, 7-dihydro-5-thiazolo[3,2-a]-pyrimidine nucleus (e.g., 5,7-dioxo - 3 - phenyl - 6,7 - dihydro - 5 - thiazolo[3,2-a]pyrimidine, etc.); a 2-thio-2,4-oxazolidinedione nucleus (i.e., those of the 2-thio-2,4(3H,5H)-oxazoledione series) (e.g., 3 - ethyl - 2 - thio-2,4-oxazolidinedione, 3-(2-sulfoethyl) - 2 - thio - 2,4-oxazolidinedione, 3-(4-sulfobutyl)-2-thio-2,4-oxazolidinedione, 3-(3-carboxypropyl)-2-thio-2,4-oxazolidinedione, etc.); a thianaphthenone nucleus (e.g., 3-(2H)-thianaphthenone, etc.); a 2-thio-2,5-thiazolidinedione nucleus (i.e., the 2-thio-2,5-(3H,4H)-thiazoledione series) (e.g., 3-ethyl-2-thio-2,5-thiazolidinedione, etc.); a 2,4-thiazolidinedione nucleus (e.g., 2,4-thiazolidinedione, 3-ethyl-2,4-thiazolidinedione, 3-phenyl-2,4-thiazolidinedione, 3-α-naphthyl-2,4-thiazolidinedione, etc.); a thiazolidinone nucleus (e.g., 4-thiazolidinone, 3-ethyl-4-thiazolidinone, 3-phenyl-4-thiazolidinone, 3-α-naphthyl-4-thiazolidinone, etc.); a 2-thiazolin-4-one series (e.g., 2-ethylmercapto-2-thiazolin-4-one, 2-alkylphenylamino-2-thiazolin-4-one, 2-diphenylamino-2-thiazolin-4-one, etc.); a 2-imino-4-oxazolidinone (i.e., pseudohydantoin)) nucleus; a 2,4-imidazolidinedione (hydantoin) series (e.g., 2,4-imidazolidinedione, 3-ethyl-2,4-imidazolidinedione, 3-phenyl-2,4-imidazolidinedione, 3-α-naphthyl-2,4-imidazolidinedione, 1,3-diethyl-2,4-imidazolidinedione, 1-ethyl-3-phenyl-2,4-imidazolidinedione, 1 - ethyl - 3-α-naphthyl-2,4-imidazolidinedione, 1,3-diphenyl-2,4-imidazolidinedione, etc.); a 2-thio-2,4-imidazolidinedione (i.e., 2-thiohydantoin) nucelus (e.g., 2-thio-2,4-imidazolidinedione, 3-ethyl-2-thio-2,4 - imidazolidinedione, 3-(4-sulfobutyl)-2-thio-2,4-imidazolidinedione, 3 - (2-carboxyethyl)-2-thio-2,4-imidazolidinedione, 3-phenyl-2-thio-2,4-imidazolidinedione, 3-α-naphthyl-2-thio-2,4-imidazolidinedione, 1,3-diethyl-2-thio-2,4 - imidazolidinedione, 1-ethyl-3-phenyl-2-thio-2,4-imidazolidinedione, 1-ethyl-3-α-naphthyl-2-thio-2,4-imidazolidinedione, 1,3-diphenyl-2-thio-2,4-imidazolidinedione, etc.); a 2-imidazolin-5-one nucleus (e.g., 2-propylmercapto-2-imidazolin-5-one, etc.), etc. (especially useful are nuclei wherein Q represents a heterocyclic nucleus containing 5 atoms in the heterocyclic ring, 3 of said atoms being carbon atoms, 1 of said atoms being a nitrogen atom, and 1 of said atoms being selected from the group consisting of a nitrogen atom, an oxygen atom, and a sulfur atom).

The imidazo[4,5-b]quinoxaline nucleus in the dyes of this invention can contain various substituents, such as at least one halogen substituent, e.g., chloro or bromo, dichloro, etc.; nitro; cyano; or, a fused aryl ring (such as phenyl) to provide, for example, an 8H-benzo[f]imidazo[4,5-b]quinoxaline nucleus. Dyes which contain a nitro, a mono- or a di-chloro substituted imidazo[4,5-b]quinoxaline nucleus are of particular advantage in fogged, direct positive photographic silver halide emulsions. Such nitro or chloro-substituted dyes have an unexpectedly sharp adsorption peak and in addition impart an unexpected increase in speed to such emulsions. Halogen substituted dyes (such as chloro substituted dyes) provide unexpected improved overall results (as compared to the non-halogen substituted analogs) in direct positive emulsions with respect to speed, higher D max. or lower D min.

The above defined dye compounds are power desensitizers for light-sensitive photographic silver halide emulsions and may be used when desensitization by means of dyes is required. The dyes absorb strongly and sharply, and their colors are uniform and deep. A number of them are bleachable by photographic developers and may thus also be used as bleachable dyes in filter layers or backing layers in photographic elements. The dye compounds can also be used as biological stains.

In accordance with the invention, we prepare the dye compounds defined by the above Formulas I, II, III and IV from our new imidazo[4,5-b]quinoxalinium salt intermediates represented by the formula:

(V)
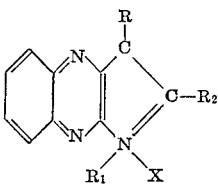

wherein R, $R_1$ and X are as previously defined and $R_2$ represents a member selected from an alkyl group of from 1–4 carbon atoms, e.g., methyl, ethyl, propyl, isopropyl, butyl, sec-butyl, etc., or benzyl, phenylethyl, or an aryl group, e.g., phenyl, p-tolyl, etc. In general, our dyes are produced by heating a mixture of a quaternary salt of above Formula V with the appropriate intermediate. The reaction mixtures are heated to advantage in any of the suitable solvents used in dye synthesis including solvents such as ethanol, propanol, dioxane, pyridine, quinoline, and the like, at temperatures up to the reflux temperature of the mixture. Advantageously, the reaction is carried out in the presence of a basic condensing agent such as a pyridine or an amine, e.g., trimethylamine, triethylamine, tri-n-propylamine, tri-n-butylamine, N-methylpiperidine, N-ethylpiperidine, N,N-dimethylaniline, N,N-diethylaniline, etc.

The symmetrical cyanine dyes of Formula I are prepared to advantage by heating a mixture of a compound of Formula V (in which $R_2$ is methyl) with diethoxymethyl acetate (forms carbocyanine), trimethoxypropene (forms dicarbocyanine), 1-anilino-5-phenylimino-1,3-pentadiene hydrochloride (forms tricarbocyanine), etc., preferably in a solvent and in the presence of a basic condensing agent such as mentioned above, if desired.

The unsymmetrical cyanine dyes of Formula II are prepared advantageously by heating a mixture of a compound of Formula V (in which $R_2$ is methyl) with a compound of the formula:

(VI)
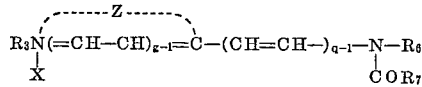

wherein $R_3$, X and Z are as previously defined, $g$ and $q$ each represents a positive integer of from 1 to 2, $R_6$ represents an aryl group of from 6–7 carbon atoms, e.g., phenyl, p-tolyl, etc., and $R_7$ represents an alkyl group of from 1–12 carbon atoms. This is preferably carried out in a suitable solvent and in the presence of a basic condensing agent.

The styryl dyes of Formula III are prepared to advantage by heating a mixture of a compound of Formula V (in which $R_2$ is methyl) with the appropriate N,N-disubstituted p-aminobenzaldehyde, or N,N-disubstituted p-aminocinnamaldehyde preferably in a suitable solvent and in the presence of a basic condensing agent.

Our mercocyanine dyes of Formula IV are made to advantage by heating a mixture of a compound of Formula V (in which $R_2$ is methyl) with a compound of the formula:

(VII)
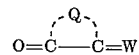

wherein Q is as defined previously and W represents the group

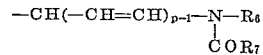

wherein $p$ represents a positive integer of from 1 to 2 and $R_6$ and $R_7$ are as previously defined.

The following examples will serve to illustrate more fully the manner whereby we prepare the new intermediates and dyes therefrom, and the use of these new dyes. Temperatures are given as degrees centigrade in each of the examples.

Example 1.—1,1′,3,3′-tetraethylimidazo[4,5-b]quinoxalinocarbocyanine chloride

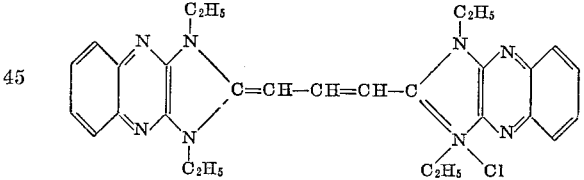

A mixture of 2.8 g. (2 mols.) of 1,3-diethyl-2-methylimidazo[4,5-b]quinoxalinium chloride and 1.5 g. (1 mol. plus 100% excess) of diethoxymethylacetate in 10 ml. of pyridine was refluxed 10 minutes. After chilling, the reaction mixture was filtered and the solid washed with ethyl alcohol. After two recrystallizations from ethyl alcohol, 0.9 g. (34%) of pure dye was obtained as dark crystals with a bright reflex, M.P. 250–252° dec. It was bleachable by photographic developers, i.e., developer solutions, such as Kodak developer D–76.

Example 2.—1,1′,3,3′-tetraethylimidazo[4,5-b]quinoxalinodicarbocyanine chloride

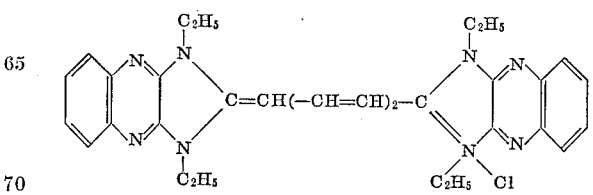

A mixture of 2.8 g. (2 mols.) of 1,3-diethyl-2-methylimidazo[4,5-b]quinoxalinium chloride and 1.6 g. (1 mol. plus 100% excess) of 1,1,3-trimethoxypropene in 10 ml. of pyridine was refluxed 10 minutes. After chilling, the reaction mixture was filtered and the solid washed with ethyl alcohol. After two recrystallizations from ethyl alcohol, 1.1 g. (40%) of pure dye was obtained as green crystals, M.P. 231–232° dec. It was bleachable by photographic developers.

Example 3.—1,3,3'-triethylimidazo[4,5-b]quinoxalino-oxacarbocyanine iodide

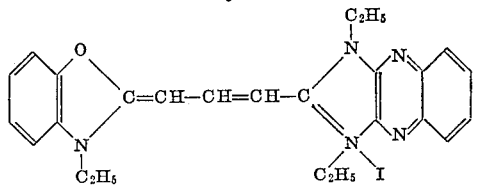

A mixture of 1.4 g. (1 mol.) of 1,3-diethyl-2-methylimidazo[4,5-b]quinoxalinium chloride, and 2.2 g. (1 mol.) of 2-β-acetanilidovinyl-3-ethylbenzoxazolium iodide in 10 ml. of ethyl alcohol and 0.5 g. (1 mol.) of triethylamine was refluxed 15 minutes. After chilling, the reaction mixture was filtered and the solid was washed with ethyl alcohol. After two recrystallizations from methyl alcohol, 0.9 g. (33%) of pure dye was obtained as dark crystals with a silvery reflex, M.P. 282–283° dec. It was bleachable by photographic developers.

Example 4.—1,3,3'-triethylimidazo[4,5-b]quinoxalino-thia-carbocyanine iodide

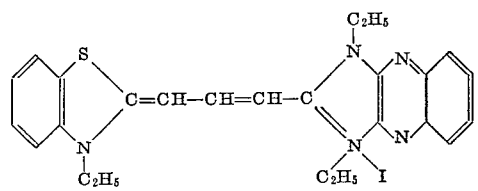

A mixture of 1.4 g. (1 mol.) of 1,3-diethyl-2-methylimidazo[4,5-b]quinoxalinium chloride and 2.25 g. (1 mol.) of 2-β-acetanilidovinyl-3-ethylbenzothiazolium iodide in 10 ml. of ethyl alcohol and 0.5 g. (1 mol.) of triethylamine was refluxed 15 minutes. After chilling, the reaction mixture was filtered and the solid washed with ethyl alcohol. After two recrystallizations from methyl alcohol, 1.15 g. (41%) of pure dye was obtained as green crystals with a golden reflex, M.P. 284–285° dec. It was bleachable by photographic developers.

Example 5.—1,3-diethyl-1',3',3'-trimethylimidazo[4,5-b]quinoxalinoindocarbocyanine iodide

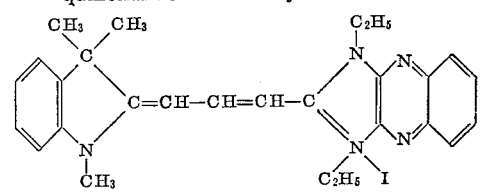

A mixture of 1.4 g. (1 mol.) of 1,3-diethyl-2-methylimidazo[4,5-b]quinoxalinium chloride and 2.2 g. (1 mol.) of 2-β-acetanilidovinyl-1,3,3-trimethyl-3H-indolium iodide in 10 ml. of ethyl alcohol and 0.5 g. (1 mol.) of triethylamine was refluxed 15 minutes. After chilling, the reaction mixture was filtered and the solid washed with ethyl alcohol. After two recrystallizations from methyl alcohol, 0.8 g. (29%) of pure dye was obtained as green needles, M.P. 273–274° dec. It was bleachable by photographic developers.

Example 6.—1,3-diethyl-3'-methylimidazo[4,5-b]quinoxalino-thiazolino-carbocyanine iodide

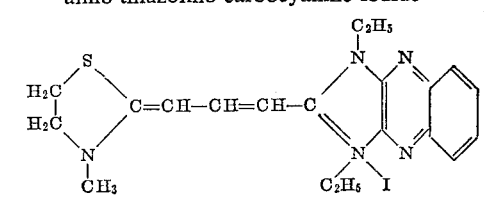

A mixture of 1.4 g. (1 mol.) of 1,3-diethyl-2-methylimidazo[4,5-b]quinoxalinium chloride and 1.8 g. (1 mol.) of 2-β-anilinovinyl-3-methylthiazolinium iodide in 10 ml. of ethyl alcohol was treated with 0.5 g. (1 mol.) of acetic anhydride and 1 g. (2 mols.) of triethylamine and the mixture was refluxed 15 minutes. After chilling, the reaction mixture was filtered and the solid washed with ethyl alcohol. After two recrystallizations from methyl alcohol, 1.1 g. (44%) of pure dye was obtained as brown crystals, M.P. 281–282° dec. It was bleachable by photographic developers.

Example 7.—1,1',3-triethylimidazo[4,5-b]quinoxalino-2'-carbocyanine iodide

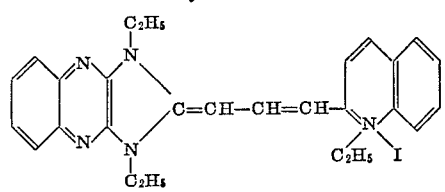

A mixture of 1.4 g. (1 mol.) of 1,3-diethyl-2-methylimidazo[4,5-b]quinoxalinium chloride and 2 g. (1 mol.) of 2-β-anilinovinyl-1-ethylquinolinium iodide in 10 ml. of ethyl alcohol was treated with 0.5 g. (1 mol.) of acetic anhydride and 1 g. (2 mols.) of triethylamine and the mixture was refluxed 15 minutes. After chilling, the reaction mixture was filtered and the solid washed with ethyl alcohol. The solid was extracted three times with methyl alcohol, and the residue recrystallized from pyridine. The pure dye was obtained in a 5% yield as dull green crystals, M.P. 291–292° dec. It was bleachable by photographic developers.

Example 8.—2-p-dimethylaminostyryl-1,3-diethylimidazo[4,5-b]quinoxalinium iodide

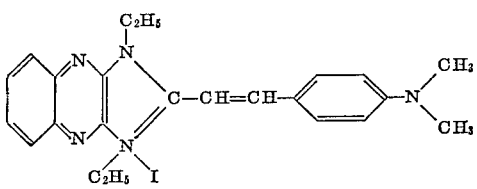

A mixture of 1.4 g. (1 mol.) of 1,3-diethyl-2-methylimidazo[4,5-b]quinoxalinium chloride and 1 g. (1 mol. plus 33% excess) of p-dimethylaminobenzaldehyde in 10 ml. of ethyl alcohol and 3 drops of piperidine was refluxed 1 hour. After chilling the reaction mixture was filtered and the solid washed with ethyl alcohol. The filtrate was treated with a solution of 3 g. of sodium iodide in 5 ml. of water. After chilling, the mixture was filtered and the solid washed with ethyl alcohol. After two recrystallizations from methyl alcohol, 0.5 g. (20%) of pure dye was obtained as green crystals with a golden reflex, M.P. 262–263° dec. It was bleachable by photographic developers.

Example 9.—5-[(1,3-diethylimidazo[4,5-b]quinoxalin-2-ylidene)ethylidene]-3-ethylrhodanine

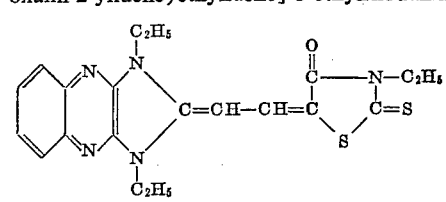

A mixture of 2.8 g. (1 mol.) of 1,3-diethyl-2-methylimidazo[4,5-b]quinoxalinium chloride and 3 g. (1 mol.) of 5-acetanilidomethylene-3-ethylrhodanine in 15 ml. of pyridine and 1 g. of triethylamine was refluxed 45 minutes. The reaction mixture was diluted with 50 ml. of ethyl alcohol and chilled. The solid was filtered off and washed with ethyl alcohol. The crude dye was dissolved in pyridine and precipitated with methyl alcohol. A 29% yield of pure dye was obtained as purplish needles, M.P. 285–286° dec. It was not bleachable by photographic developers.

Example 10.—5-[1,3-diethylimidazo[4,5-b]quinoxalin-2-ylidene)ethylidene]-1,3-diethyl-2-thiobarbituric acid

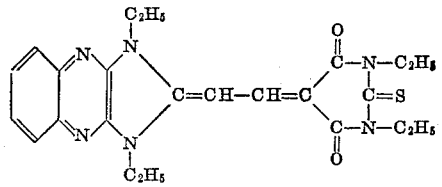

A mixture of 1.4 g. (1 mol.) of 1,3-diethyl-2-methyl imidazo[4,5-b]quinoxalinium chloride and 1.5 g. (1 mol.) of 5-anilinomethylene-1,3-diethyl-2-thiobarbituric acid in 10 ml. of pyridine was treated with 0.5 g. (1 mol.) of acetic anhydride and 1.0 g. (2 mols.) of triethylamine and the mixture refluxed 45 minutes. The reaction mixture was diluted with 50 ml. of ethyl alcohol and chilled. The solid was filtered off and washed with ethyl alcohol. The crude dye was dissolved in pyridine was precipitated with methyl alcohol. The solid was washed with decantation several times with ethyl ether. The remaining solid was dissolved in pyridine and precipitated with methyl alcohol. An 18% yield of pure dye was obtained as maroon crystals with a silvery reflex, M.P.>320°. It was not bleachable by photographic developers.

Example 11.—1,3-diethyl-2-methylimidazo[4,5-b]quinoxalinium chloride

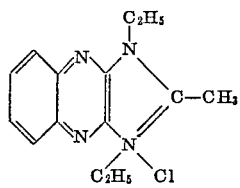

To a solution of 32.4 g. (1 mol.) of 2,3-bis(ethylamino)quinoxaline [Hinsberg and Schwantes, Ber. 36, 4050 (1903)] in 125 ml. of dimethylacetamide was added 24 g. (1 mol. plus 100% excess) of acetyl chloride in small portions with shaking. After the addition was complete, the solid reaction product was heated and the solid dissolved. The solution was refluxed 20 minutes and then cooled. After adding 300 ml. of acetone the mixture was chilled. The solid was filtered off and washed with acetone. A yield of 17.8 g. (43%) was obtained, M.P. 198–200° dec. Reworking the filtrates yielded an additional 12 g. (28%).

In place of the 2,3-bis(ethylamino)quinoxaline in the above example, there may be substituted an equivalent amount of other related quinoxalines, for example, 2,3-bis(methylamino)-quinoxaline to give 1,2,3-trimethyl-imidazo[4,5-b]quinoxalinium chloride, or 2,3-bis(propylamino)quinoxaline to give 1,3-dipropyl-2-methylimidazo[4,5-b]quinoxalinium chloride, or 2,3-bis(butylamino)quinoxaline to give 1,3-dibutyl-2-methylimidazo-[4,5-b]quinoxalinium chloride, etc. Also, in place of the acetyl chloride in the above example, there may be substituted an equivalent amount of related acyl chlorides, for example, propionyl chloride to give the corresponding 1,2,3-triethylimidazo[4,5-b]quinoxalinium chloride, or butyryl chloride to give the corresponding 1,3-diethyl-2-propyl-imidazo[4,5-b]quinoxalinium chloride, or valeryl chloride to give the corresponding 1,3-diethyl-2-butylimidazo [4,5-b]quinoxalinium chloride, and the like. It will also be understood that any other of the mentioned starting 2,3-bis(alkylamino)quinoxalines will give with propionyl chloride, butyryl chloride or valeryl chloride the corresponding 1,3 - dialkyl - 2 - alkylimidazo[4,5 - b]quinoxalinium chlorides.

Example 12.—1,1′,3,3′-tetra(2-hydroxyethyl)imidazo [4,5-b]quinoxalinocarbocyanine iodide

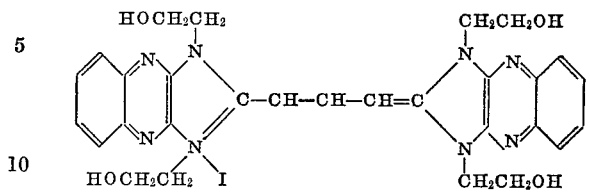

A mixture of 8.8 g. (2 mols.) of 1,3-di(2-hydroxyethyl) - 2-methylimidazo[4,5-b]quinoxalinium p-toluenesulfonate, 2 g. (1 mol.+25% excess) of diethoxymethyl acetate, and 15 ml. of pyridine was refluxed ten minutes. The reaction mixture was chilled and then filtered. The filtrate was treated with ether and the oily layer separated from the supernatant liquid by decantation, and then washed with ether. The oily layer was stirred with a small amount of ethyl alcohol and chilled. The solid was collected on a filter and washed with ethyl alcohol. The filtrate was treated with an aqueous solution of five grams of sodium iodide. The crude dye was collected on a filter and washed with water. After recrystallization from methyl alcohol, 0.2 g. (3%) of pure dye was obtained as green crystals, M.P. 254–255° dec.

Example 13.—1,3-di(2-hydroxyethyl)-1′,3′,3′-trimethyl-imidazo[4,5-b]quinoxalino-indocarbocyanine iodide

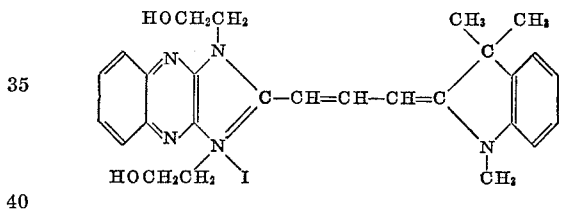

A mixture of 4.4 g. (1 mol.) of 1,3-di(2-hydroxyethyl) - 2-methylimidazo[4,5-b]quinoxalinium p-toluenesulfonate, 4.4 g. (1 mol.) of 2-acetanilidovinyl-1,3,3-trimethyl-3H-indolium iodide, 15 ml. of ethyl alcohol, and 1 g. of triethylamine was refluxed 30 minutes. The reaction mixture was chilled and treated with ether. The oily layer was separated from the supernatant liquid and washed with ether and then with water. The residue was titrated with ethyl alcohol and chilled. The crude dye was collected on a filter and washed lightly with ethyl alcohol. After recrystallization from methyl alcohol, 1.1 g. (19%) of pure dye was obtained as green crystals, M.P. 273–274° dec.

Example 14.—2-p-dimethylaminostyryl-1,3-di(2-hydroxyethyl)imidazo[4,5-b]quinoxalinium p-toluenesulfonate

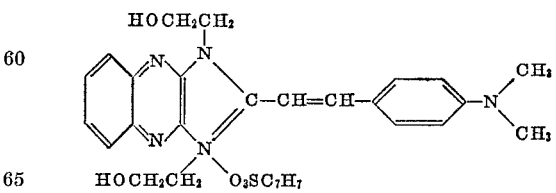

A mixture of 4.4 g. (1 mol.) of 1,3-di(2-hydroxyethyl) - 2-methylimidazo[4,5-b]quinoxalinium p-toluenesulfonate, 1.5 g. (1 mol.) of p-dimethylaminobenzaldehyde, 15 ml. of ethyl alcohol and three drops of piperidine was refluxed three hours. The reaction mixture was chilled and the crude dye collected on a filter and washed with ethyl alcohol and then with acetone. After recrystallization from methyl alcohol, 0.3 g. (5%) of pure dye was obtained as dark green crystals, M.P. 280–281° dec.

Example 15.—1,1',3,3'-tetraallylimidazo[4,5-b]
quinoxalinocarbocyanine p-toluenesulfonate

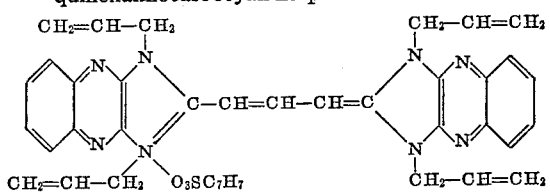

A mixture of 4.4 g. (2 mols.) of 1,3-diallyl-2-methyl-imidazo[4,5-b]quinoxalinium p-toluenesulfonate, 1.6 g. (1 mol.+100% excess) of diethoxymethyl acetate, and 10 ml. of pyridine was refluxed five minutes. The reaction mixture was chilled and the crude dye was collected on a filter and washed with acetone. After recrystallization from methyl alcohol, 2.5 g. (70%) of pure dye was obtained as green crystals with a shiny reflex, M.P. 245–246° dec.

Example 16.—1,3-diallyl-3'-ethylimidazo[4,5-b]
quinoxalino-oxacarbocyanine iodide

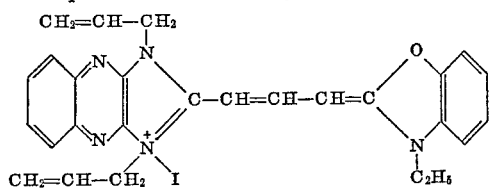

A mixture of 2.2 g. (1 mol.) of 1,3-diallyl-2-methyl-imidazo[4,5-b]quinoxalinium p-toluenesulfonate, 2.2 g. (1 mol.) of 2-β-acetanilidovinyl-3-ethylbenzoxazolium iodide, 10 ml. of ethyl alcohol, and 0.5 g. (1 mol.) of triethylamine was refluxed ten minutes. The reaction mixture was chilled and the crude dye was collected on a filter and washed with ethyl alcohol and then with water. After recrystallization from methyl alcohol, 1.6 g. (57%) of pure dye was obtained as dark crystals with a shiny reflex, M.P. 253–254° dec.

Example 17.—1,3-diallyl-3'-ethylimidazo[4,5-b]
quinoxalinoethiacarbocyanine iodide

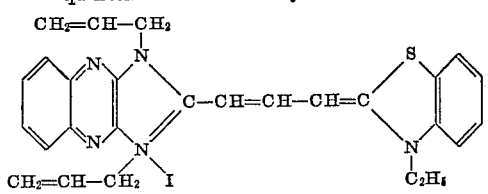

A mixture of 2.2 g. (1 mol.) of 1,3-diallyl-2-methyl-imidazo[4,5-b]quinoxalinium p-toluenesulfonate, 2.25 g. (1 mol.) of 2-β-acetanilidovinyl-3-ethylbenzothiazolium iodide, 10 ml. of ethyl alcohol, and 0.5 g. (1 mol.) of triethylamine was refluxed ten minutes. The reaction mixture was chilled and the crude dye was collected on a filter and washed with ethyl alcohol and then with water. After recrystallization from methyl alcohol, 2.0 g. (69%) of pure dye was obtained as dark green crystals, M.P. 250–251° dec.

Example 18.—1,3-diallyl-1',3',3'-trimethylimidazo[4,5-b]
quinoxalinoindocarbocyanine iodide

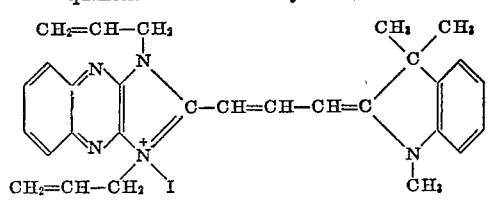

A mixture of 2.2 g. (1 mol.) of 1,3-diallyl-2-methyl-imidazo[4,5-b]quinoxalinium p-toluenesulfonate, 2.25 g. (1 mol.) of 2-β-acetanilidovinyl-1,3,3-trimethyl-3H-indolium iodide, 10 ml. of ethyl alcohol, and 0.5 g. (1 mol.) of triethylamine was refluxed ten minutes. The reaction mixture was chilled and the crude dye collected on a filter and washed with ethyl alcohol. After recrystallization from methyl alcohol, 1.4 g. (48%) of pure dye was obtained as green crystals with a shiny reflex, M.P. 246–247° dec.

Example 19.—1,3-diallyl-3'-ethyl-4',5'-benzoimidazo[4,5-b]quinoxalino thiacarbocyanine p-toluenesulfonate

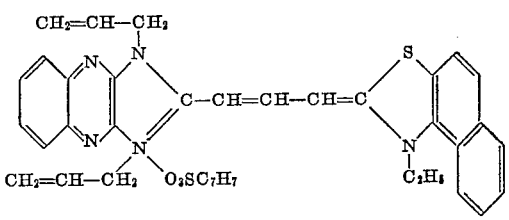

A mixture of 2.2 g. (1 mol.) of 1,3-diallyl-2-methyl-imidazo[4,5-b]quinoxalinium p-toluenesulfonate, 2.5 g. (1 mol.) of 2-β-anilinovinyl-1-ethylnaphtho[1,2-d]thiazolium p-toluenesulfonate, 15 ml. of ethyl alcohol, 0.5 g. (1 mol.) of acetic anhydride, and 1 g. (2 mols.) of triethylamine was refluxed 15 minutes. The reaction mixture was chilled and the crude dye was collected on a filter and washed with ethyl alcohol. After recrystallization from methyl alcohol, 1.8 g. (57%) of pure dye was obtained as green needles with a shiny reflex, M.P. 243–244° dec.

Example 20.—1,3-diallyl-1'-ethylimidazo[4,5-b]quinoxalino-2'-carbocyanine iodide

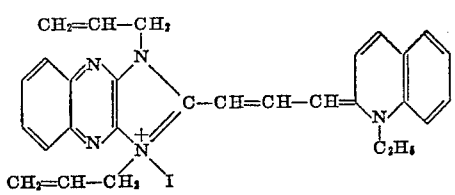

A mixture of 2.2 g. (1 mol.) of 1,3-diallyl-2-methyl-imidazo[4,5-b]quinoxalinium p-toluenesulfonate, 2 g. (1 mol.) of 2-β-anilinovinyl-1-ethylquinolinium iodide, 20 ml. of acetic anhydride and 1 g. (2 mols.) of triethylamine was stirred for 3½ hours at room temperature. The reaction mixture was chilled, and the crude dye was collected on a filter and then washed with acetic anhydride, then with water and then with acetone. After recrystallization from methyl alcohol, 1 g. (34%) of pure dye was obtained as green crystals with a shiny reflex, M.P. 261–262° dec.

Example 21.—1,3-diallyl-2-p-dimethylaminostyrylimidazo[4,5-b]quinoxalinium p-toluenesulfonate

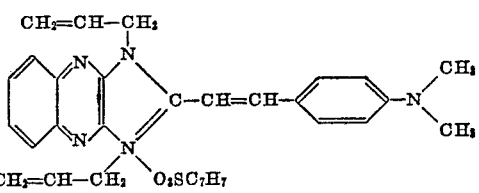

A mixture of 2.2 g. (1 mol.) of 1,3-diallyl-2-methyl-imidazo[4,5-b]quinoxalinium p-toluenesulfonate, 1 g. (1 mol.+33% excess) of p-dimethylaminobenzaldehyde, and 15 ml. of acetic anhydride was refluxed five minutes. The reaction mixture was chilled and the crude dye collected on a filter and washed with acetic anhydride. After recrystallization from ethyl alcohol, 1.3 g. (45%) of pure dye was obtained as green crystals with a bright reflex, M.P. 238–239° dec.

Example 22.—5-[(1,3-diallylimidazo[4,5-b]quinoxalin-2(3H)-ylidene)ethylidene]-3-ethylrhodanine

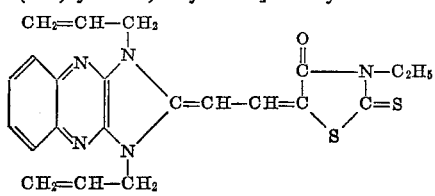

A mixture of 2.2 g. (1 mol.) of 1,3-diallyl-2-methylimidazo[4,5-b]quinoxalinium p-toluenesulfonate, 1.6 g. (1 mol.) of 5-acetanilidomethylene-3-ethylrhodanine, and 10 ml. of pyridine was refluxed ten minutes and then 20 ml. of methyl alcohol was added. The reaction mixture was chilled and the crude dye collected on a filter and washed with methyl alcohol. After recrystallization from a mixture of pyridine and methyl alcohol, 1.4 g. (64%) of pure dye was obtained as purplish needles, M.P. 227–228° dec.

Example 23.—1,1',3,3'-tetraphenylimidazo[4,5-b]quinoxalinocarbocyanine p-toluenesulfonate

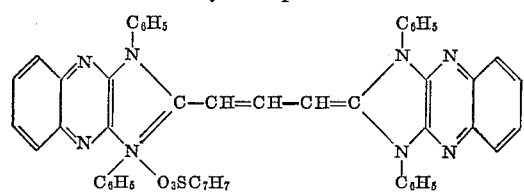

A mixture of 5.1 g. (2 mols.) of 2-methyl-1,3-diphenylimidazo[4,5-b]quinoxalinium p-toluenesulfonate, 1.6 g. (1 mol.+100% excess) of diethoxymethyl acetate, and 15 ml. of pyridine was refluxed ten minutes. The reaction mixture was chilled and the crude dye collected on a filter and washed with water and then with acetone. After recrystallization from methyl alcohol, 1.9 g. (44%) of pure dye was obtained as bluish crystals with a shiny reflex, M.P. 286–288° dec.

Analysis.—Calcd. for $C_{52}H_{38}N_8O_3S$: C, 73.02; H, 4.48. Found: C, 73.2; H, 4.5.

Example 24.—3'-ethyl-1,3-diphenylimidazo[4,5-b]quinoxalinothiacyanine iodide

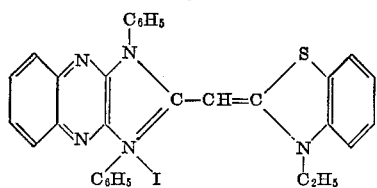

A mixture of 2.6 g. (1 mol.) of 2-methyl-1,3-diphenylimidazo[4,5-b]quinoxalinium p-toluenesulfonate, 2 g. (1 mol.) of 3-ethyl-2-phenylmercaptobenzothiazolium iodide, 15 ml. of ethyl alcohol, and 0.5 g. (1 mol.) of triethylamine was refluxed for 15 minutes. The reaction mixture was chilled and the crude dye collected on a filter and washed with water and then with acetone. After recrystallization from methyl alcohol, 0.7 g. (23%) of pure dye was obtained as yellow plates, M.P. 288–289° dec.

Example 25.—3'-ethyl-1,3-diphenylimidazo[4,5-b]quinoxalino-oxacarbocyanine iodide

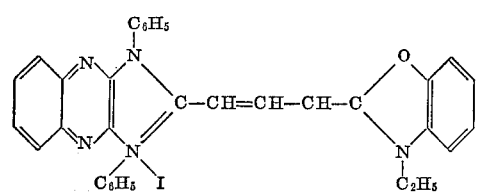

A mixture of 2.6 g. (1 mol.) of 2-methyl-1,3-diphenylimidazo[4,5-b]quinoxalinium p-toluenesulfonate, 2.2 g. (1 mol.) of 2-β-acetanilidovinyl-3-ethylbenzoxazolium iodide, 15 ml. of ethyl alcohol, and 0.5 g. (1 mol.) of triethylamine was refluxed 15 minutes. The reaction mixture was chilled and the crude dye collected on a filter and washed with water and then with acetone. After recrystallization from methyl alcohol, 0.6 g. (19%) of pure dye was obtained as green crystals with a shiny reflex, M.P. 289–290° dec.

Example 26.—3'-ethyl-1,3-diphenylimidazo[4,5-b]quinoxalinothiacarbocyanine iodide

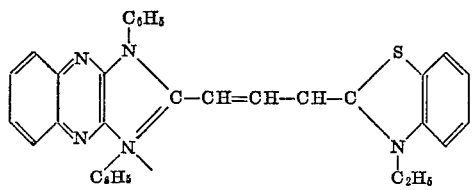

A mixture of 2.6 g. (1 mol.) of 2-methyl-1,3-diphenylimidazo[4,5-b]quinoxalinium p-toluenesulfonate, 2.25 g. (1 mol.) of 2-β-acetanilidovinyl-3-ethylbenzothiazolium iodide, 15 ml. of ethyl alcohol, and 0.5 g. (1 mol.) of triethylamine was refluxed 15 minutes. The reaction mixture was chilled and the crude dye was collected on a filter and washed with water and then with acetone. After recrystallization from methyl alcohol, 1.0 g. (30%) of pure dye was obtained as dark green crystals, M.P. 288–289° dec.

Example 27.—1',3',3'-trimethyl-1,3-diphenylimidazo[4,5-b]quinoxalinoindocarbocyanine iodide

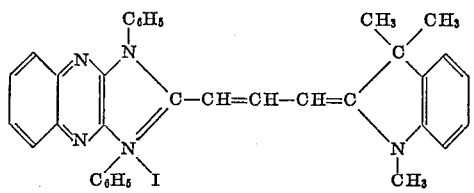

A mixture of 2.6 g. (1 mol.) of 2-methyl-1,3-diphenylimidazo[4,5-b]quinoxalinium - p - toluenesulfonate, 2.2 g. (1 mol.) of 2-β-acetanilidovinyl-1,3,3-trimethyl-3H-indolium iodide, 15 ml. of ethyl alcohol, and 0.5 g. (1 mol.) of triethylamine was refluxed 15 minutes. The reaction mixture was chilled and the crude dye collected on a filter and washed with water and then with acetone. After recrystallization from methyl alcohol, 0.7 g. (22%) of pure dye was obtained as dark red crystals with a shiny reflex, M.P. 299–300° dec.

Example 28.—1'-ethyl-1,3-diphenylimidazo[4,5-b]quinoxalino-2'-carbocyanine iodide

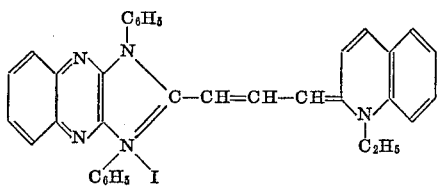

A mixture of 2.6 g. (1 mol.) of 2-methyl-1,3-diphenylimidazo[4,5-b]quinoxalinium p-toluenesulfonate, 2 g. (1 mol.) of 2-β-anilinovinyl-2-ethylquinolinium iodide, 10 ml. of acetic anhydride, and 1 g. (2 mols.) of triethylamine was stirred at room temperature for two hours. The reaction mixture was chilled and then filtered. The filtrate was treated with 500 ml. of ether and the oily layer separated from the supernatant liquid by decantation and then washed first with ether and then with water. The oily layer was treated with acetone and the mixture chilled. The crude dye was collected on a filter and washed with acetone. After recrystallization from pyridine, 0.3 g. (9%) of pure dye was obtained as green crystals with a shiny reflex, M.P. 284–285° dec.

Example 29.—2-p-dimethylaminostyryl-1,3-diphenyl-imidazo[4,5-b]quinoxalinium p-toluenesulfonate

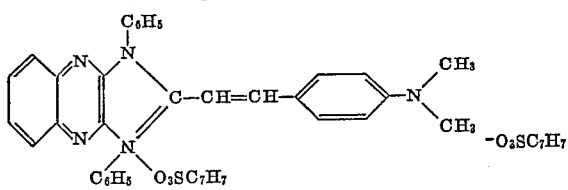

A mixture of 2.6 g. (1 mol.) of 2-methyl-1,3-diphenyl-imidazo[4,5-b]quinoxalinium p-toluenesulfonate, 1 g. (1 mol. +33% excess) of p-dimethylaminobenzaldehyde and 15 ml. of acetic anhydride was refluxed ten minutes. The reaction mixture was chilled and the crude dye collected on a filter and washed with acetone. After recrystallization from ethyl alcohol, 0.65 g. (20%) of pure dye was obtained as deep red crystals, M.P. 250–251° dec.

Example 30.—5-[(1,3-diphenylimidazo[4,5-b]quinoxalin-2(3H)-ylidene)ethylidene]-3-ethylrhodanine

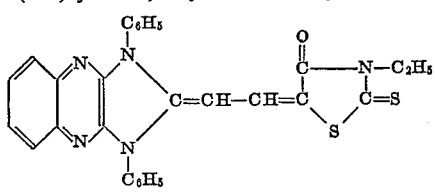

A mixture of 2.6 g. (1 mol.) of 2-methyl-1,3-diphenyl-imidazo[4,5-b]quinoxalinium p-toluenesulfonate, 1.6 g. (1 mol.) of 5-acetanilidomethylene-3-ethylrhodanine, and 10 ml. of pyridine was refluxed ten minutes. The reaction mixture was chilled and the crude dye collected on a filter and washed with ethyl alcohol. After recrystallization from a mixture of pyridine and methyl alcohol, 1.65 g. (66%) of pure dye was obtained as purplish needles, M.P. >320° dec.

The examples which follow illustrate the preparation of a number of intermediate compounds that are employed in above Examples 12 to 30 of the invention.

Example 31.—2,3-di-(2-hydroxyethylamino)quinoxaline

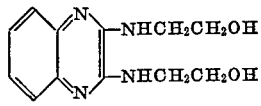

2,3-dichloroquinoxaline (25 g., 1 mol.) was added in portions to 31 g. (4 mols.) of 2-hydroxyethylamine with shaking. After ¼ of the addition was complete, the temperature rose and the addition was completed with cooling. The reaction mixture was heated on a steam bath for four hours. The reaction mixture was stirred with water and the product collected on a filter and washed with water. A yield of 31 g. (100%) of colorless crystals was obtained, M.P. 180–182°.

*Analysis.*—Calcd. as $C_{12}H_{16}N_4O_2$: C, 58.04; H, 6.50; N, 22.58. Found: C, 57.7; H, 6.7; N, 22.8.

Example 32.—1,3-di(2-hydroxyethyl)-2-methylimidazo[4,5-b]quinoxalinium p-toluenesulfonate

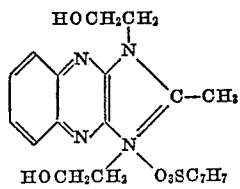

A mixture of 31.1 g. (1 mol.) of 2,3-di(2-hydroxyethylamino)quinoxaline, 19 g. (1 mol.) of p-toluene sulfonic acid, and 100 ml. of triethylorthoacetate was slowly distilled over a period of 1½ hours. The temperature of the vapors remained at 73°. The residue was washed several times with ether and used without further purification.

Example 33.—2,3-di(allylamino)quinoxaline

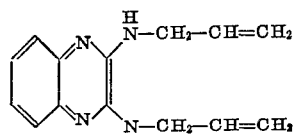

2,3-dichloroquinoxaline (20 g., 1 mol.) was added in small portions to 34.2 g. (4 mols.+50% excess) of allylamine with stirring maintaining a temperature below 45° by means of a water bath at 20°. After the addition was complete, the mixture was stirred in the water bath for 40 minutes. The mixture was then heated on a steam bath for three hours. The mixture was stirred with one l. of water for 30 minutes and then collected on a filter and washed with water. A yield of 24.2 g. (100%) of colorless product was obtained, M.P. 86–88°.

Example 34.—1,3-diallyl-2-methylimidazo[4,5-b]quinoxalinium p-toluenesulfonate

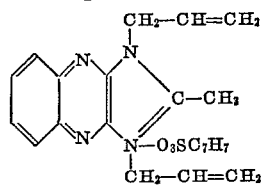

A mixture of 21.8 g. (1 mol.) of 2,3-di(allylamino)-quinoxaline, 17.1 g. (1 mol.) of p-toluenesulfonic acid, and 135 ml. of acetic anhydride was refluxed 2½ hours. The reaction mixture was chilled and treated with one l. of ether. The oily layer was separated from the supernatant liquid by decantation and then washed with ether, until the oil became crystalline. The product was collected on a filter and washed with ether. A yield of 32.5 g. (82%) of colorless salt was obtained, M.P. 157–159° dec.

*Analysis.*—Calcd. for $C_{23}H_{24}N_4O_3S$: C, 63.26; H, 5.54. Found: C, 63.1; H, 5.4.

Example 35.—2,3-dianilinoquinoxaline

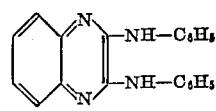

A mixture of 20 g. (1 mol.) of 2,3-dichloroquinoxaline and 40 g. (4 mols.) of aniline was fused on a steam bath and then heated for an additional hour. The reaction mixture was dissolved in 300 ml. of ethyl alcohol. Water was added in small portions until 50 ml. had been added, and the product collected on a filter and washed with water. A yield of 28 g. (93%) of colorless product was obtained, M.P. 73–80°.

Example 36.—2-methyl-1,3-diphenylimidazo[4,5-b]-quinoxalinium p-toluenesulfonate

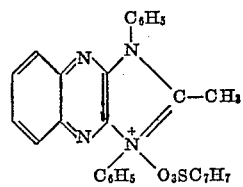

A mixture of 30 g. (1 mol.) of 2,3-dianilinoquinoxaline, 19 g. (1 mol.) of p-toluenesulfonic acid, and 150 ml. of acetic anhydride was refluxed three hours. The reaction mixture was chilled and treated with 600 ml. ether. The oily layer was separated from the supernatant liquid by decantation and then washed twice more with ether. The oily residue was treated with 300 ml. of acetone and the solid collected on a filter and washed with acetone. A yield of 30 g. (60%) of cream colored crystals was obtained, M.P. 275–285° dec.

*Analysis.*—Calcd. for C$_{29}$H$_{24}$N$_4$O$_3$S: C, 68.45; H, 4.76; N, 11.02. Found: C, 68.4; H, 5.0; N, 10.9.

Examples 37 through 64 illustrate further useful cyanine dyes featuring an imidazo[4,5-b]quinoxaline nucleus. Note that both nuclei of Examples 37, 39, 40, 42–44, 47, 48, 53, 55, 56, 58–60, 62, and 63 are desensitizing nuclei. In the formula "Ph" represents phenyl and "Me" represents methyl.

Example 37.—6,6' - dichloro-1,1',3,3'-tetraphenylimidazo-[4,5-b]quinoxalinocarbocyanine p-toluenesulfonate

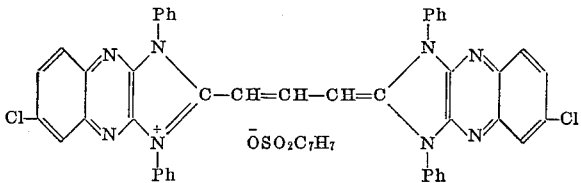

A mixture of 5.4 g. (2 mols.) of 6-chloro-2-methyl-1,3-diphenylimidazo[4,5-b]quinoxalinium p-toluenesulfonate, 1.6 g. (1 mol.+100% excess) of diethoxymethyl acetate and 10 ml. of pyridine was refluxed ten minutes. After chilling, the solid was collected on a filter, and washed with acetone. After recrystallization from methyl alcohol, 1.5 g., (33%) of pure dye was obtained as purple crystals with a green reflex, M.P. 293–294° dec.

Example 38.—6-chloro-1',3',3',-trimethyl-1,3-diphenylimidazo[4,5-b]quinoxalinoindocarbocyanine iodide

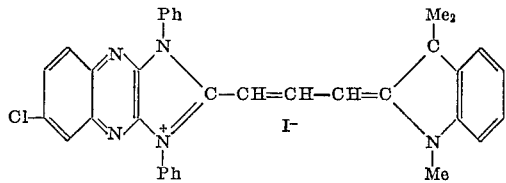

A mixture of 2.7 g. (1 mol.) of 6-chloro-2-methyl-1,3-diphenylimidazo[4,5-b]quinoxalinium p-toluenesulfonate, 2.2 g. (1 mol.) of 2-(2-acetanilidovinyl-1,3,3-trimethyl-3H-indolium iodide, 10 ml. of ethyl alcohol, and 0.5 g. (1 mol.) of triethylamine was refluxed 30 minutes. After chilling, the crude dye was collected on a filter and suspended in benzene. The dye was collected on a filter and washed with benzene. After recrystallization from methyl alcohol, 0.5 g. (14%) of pure dye was obtained as green crystals, M.P. 283–284° dec.

Example 39.—6-chloro-2-[(1-methyl-2-phenyl-3-indolyl)-vinyl] - 1,3 - diphenylimidazo[4,5-b]quinoxalinium p-toluenesulfonate

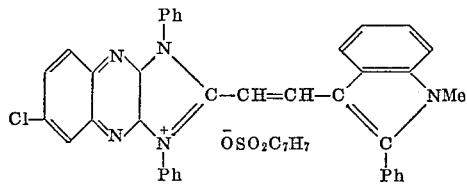

A mixture of 1.35 g. (1 mol.) of 6-chloro-2-methyl-1,3-diphenylimidazo[4,5-b]quinoxalinium p-toluenesulfonate, 0.6 g. (1 mol.) of 1-methyl-2-phenylindole-3-carboxaldehyde, and 10 ml. of acetic anhydride was refluxed ten minutes. After chilling, the crude dye was collected on a filter, washed with acetic anhydride and then with acetone. After recrystallization from ethyl alcohol, 0.5 g. (20%) of pure dye was obtained as red crystals with a shiny reflex, M.P. 288–289° dec.

Example 40.—6-chloro-2-[2-(9-methyl - 3 - carbazolyl)-vinyl] - 1,3 - diphenylimidazo[4,5-b]quinoxalinium p-toluenesulfonate

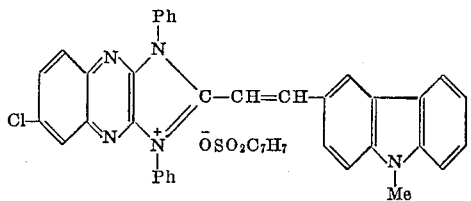

A mixture of 2.7 g. (1 mol.) of 6-chloro-2-methyl-1,3-diphenylimidazo[4,5-b]quinoxalinium p-toluenesulfonate, 1.1 g. (1 mol.+10% excess) of 9-methylcarbazole-3-carboxaldehyde, and 10 ml. of acetic anhydride was refluxed ten minutes. After chilling, the crude dye was collected on a filter, washed with acetic anhydride and then with acetone. After recrystallization from methyl alcohol, 1.85 g. (50%) of pure dye was obtained as reddish crystals, M.P. 287–288° dec.

*Analysis.*—Calcd. for C$_{43}$H$_{32}$ClN$_5$O$_3$S: C, 70.3; H, 4.4. Found: C, 70.3; H, 4.2.

Example 41.—6 - chloro-2-p-dimethylaminostyryl-1,3-diphenylimidazo[4,5-b]quinoxalinium p-toluenesulfonate

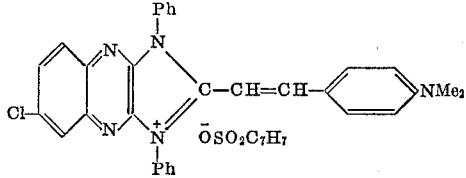

A mixture of 2.7 g. (1 mol.) of 6-chloro-2-methyl-1,3 - diphenylimidazo[4,5-b]quinoxalinium p-toluenesulfonate 1 g. (1 mol.+30% excess) of p-dimethylaminobenzaldehyde, and 10 ml. of acetic anhydride was refluxed for 20 minutes. After chilling, the crude dye was collected on a filter, washed with acetic anhydride and then with acetone. After recrystallization from ethyl alcohol, 2.0 g. (59%) of pure dye was obtained as dark crystals, M.P. 280–281° dec.

Example 42.—1,3 - diallyl - 6 - chloro - 2[2 - (1 - methyl - 2 - phenyl - 3 - indolyl)vinyl]imidazo[4,5 - b]quinoxalinium p-toluenesulfonate

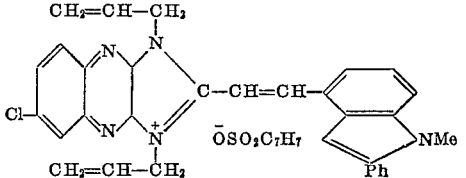

A mixture of 2.3 g. (1 mol.) of 1,3-diallyl-6-chloro-2-methylimidazo[4,5-b]quinoxalinium p - toluenesulfonate, 1.2 g. (1 mol.) of 1-methyl-2-phenylindole-3-carboxaldehyde, and 10 ml. of acetic anhydride was refluxed ten minutes. After chilling, the reaction mixture was treated with ether and the crude dye which separated was collected on a filter and washed with ether. After recrystallization from ethyl alcohol, 2.2 g. (65%) of pure dye was obtained as red needles, M.P. 240–241° dec.

*Analysis.*—Calcd. for C$_{39}$H$_{34}$ClN$_5$O$_3$S: C, 68.0; H, 5.0; N, 10.2 Found: C, 67.8; H, 4.9; N, 10.0.

Example 43.—1,1',3,3' - tetraallyl - 6,6' - dichloroimidazo[4,5-b]quinoxalinocarbocyanine p-toluenesulfonate

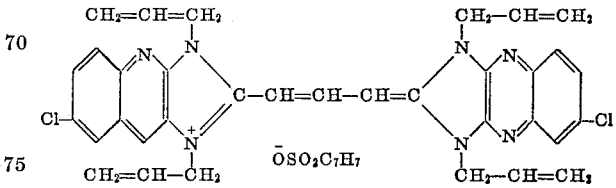

A mixture of 4.7 g. (2 mols.) of 1,3-diallyl-6-chloro-2-methylimidazo[4,5-b]quinoxalinium p-toluenesulfonate, 1.6 g. (1 mol.+100% excess) of diethoxymethyl acetate and 20 ml. of pyridine was refluxed 20 minutes. After chilling, the crude dye was collected on a filter and washed with acetone. After recrystallization from methyl alcohol, 3.1 g. (79%) of pure dye was obtained as green crystals with a golden reflex, M.P. 251–252° dec.

Example 44.—6,6',7,7' - tetrachloro - 1,1',3,3' - tetraphenylimidazo[4,5 - b] - quinoxalinocarbocyanine p-toluenesulfonate

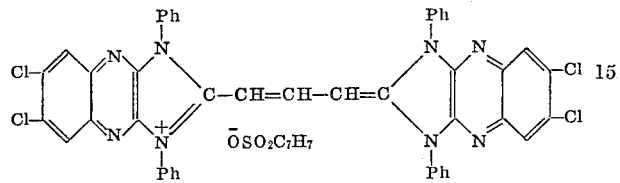

A mixture of 5.8 g. (2 mols.) of 6,7-dichloro-2-methyl-1,3 - diphenylimidazo[4,5-b]quinoxalinium p-toluenesulfonate 1.6 g. (1 mol.+100% excess) diethoxymethyl acetate and 30 ml. of pyridine was refluxed for ten minutes. After chilling, the crude dye was collected on a filter and washed with acetone. After recrystallization from methyl alcohol, 1.2 g. (24%) of pure dye was obtained as green prisms with a golden reflex, M.P. 312–313° dec.

Example 45.—6,7 - dichloro - 1',3',3' - trimethyl - 1,3-diphenylimidazo[4,5 - b]quinoxaline - indocarbocyanide iodide

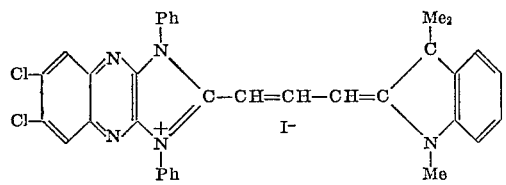

A mixture of 2.7 g. (1 mol.) of 6,7-dichloro-2-methyl-1,3-diphenylimidazo[4,5-b]quinoxalinium iodide, 2.3 g. (1 mol.) of 2 - (2 - acetanilidovinyl) - 1,3,3 - trimethyl-3H-indolium iodide, 20 ml. of acetic anhydride and 0.5 g. (1 mol.) of triethylamine was refluxed 20 minutes. After chilling, the crude dye was collected on a filter, washed with acetic anhydride and then with acetone. After recrystallization from methyl alcohol, 1.5 g. (42%) of pure dye was obtained as purplish crystals, M.P. 310–311° dec.

Example 46.—6,7 - dichloro - 1' - ethyl - 1,3 - diphenylimidazo[4,5 - b]quinoxalino - 2' - carbocyanine p-toluenesulfonate

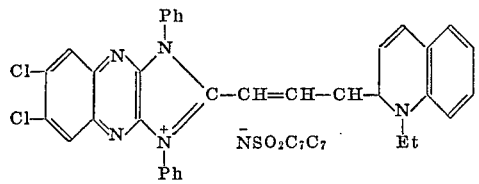

A mixture of 2.9 g. (1 mol.) of 6,7-dichloro-2-methyl-1,3 - diphenylimidazo[4,5-b]quinoxalinium p - toluenesulfonate, 2.3 g. (1 mol.) of 2-(2-acetanilidovinyl)-1-ethylquinolinium p-toluenesulfonate, and 30 ml. of acetic anhydride was stirred at room temperature for two hours and at 55–60° for 3 hours. After chilling, the mixture was filtered and the solid washed with acetic anhydride and then with acetone. The filtrates were combined and treated with ether. The solid was collected on a filter and washed with ether and then with acetone. After recrystallization from ethyl alcohol, 0.5 g. (13%) of pure dye was obtained as dark crystals with a golden reflex, M.P. 185–187° dec.

Example 47.—6,7 - dichloro - 2[2 - (9 - methyl - 3 - carbazoyl)vinyl] - 1,3 - diphenylimidazo[4,5 - b]quinoxalinium p-toluenesulfonate

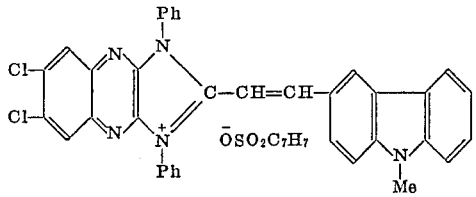

A mixture of 2.9 g. (1 mol.) of 6,7-dichloro-2-methyl-1,3 - diphenylimidazo[4,5-b]quinoxalinium p-toluenesulfonate, 1.1 g. (1 mol.) of 9-methylcarbazole-3-carboxaldehyde, and 20 ml. of acetic anhydride was refluxed 15 minutes. After chilling, the crude dye was collected on a filter, washed with acetic anhydride and then with acetone. After recrystallization from methyl alcohol, 0.6 g. (16%) of pure dye was obtained as dark red crystals, M.P. 312–313° dec.

Example 48.—6,7 - dichloro - 2 - [2 - (1 - ethyl - 2-phenyl - 3 - indolyl)vinyl] - 1,3 - diphenylimidazo[4,5-b]quinoxalinium p-toluenesulfonate

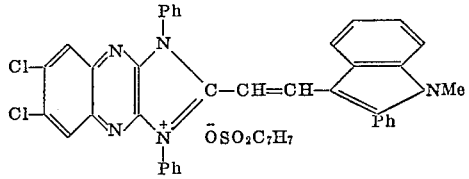

A mixture of 2.9 g. (1 mol.) of 6,7-dichloro-2-methyl-1,3 - diphenylimidazo[4,5-b]quinoxalinium p - toluenesulfonate, 1.2 g. (1 mol.) of 1-methyl-2-phenylindole-3-carboxaldehyde, and 20 ml. of acetic anhydride was refluxed 15 minutes. After chilling, the crude dye was collected on a filter and washed with acetic anhydride and then acetone. After recrystallization from methyl alcohol, 0.9 g. (22%) of pure dye was obtained as orange crystals with a green reflex, M.P. 300–301° dec.

Example 49.—6,7 - dichloro - 2 - p - dimethylaminostyryl - 1,3 - diphenylimidazo[4,5 - b]quinoxalinium p-toluenesulfonate

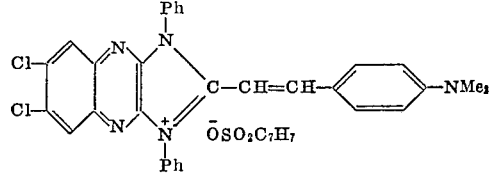

A mixture of 2.9 g. (1 mol.) of 6,7-dichloro-1,3-diphenylimidazo[4,5-b]quinoxalinium p-toluenesulfonate, 1 g. (1 mol. plus 30% excess) of p-dimethylaminobenzaldehyde and 20 ml. of acetic anhydride was refluxed 15 minutes. After chilling, the crude dye was collected on a filter and washed with acetic anhydride and then with acetone. After recrystallization from methyl alcohol, 1.2 g. (34%) of pure dye was obtained as green crystals with a red reflex, M.P. 293–294° dec.

Example 50.—4-[(6,7 - dichloro - 1,3 - diphenylimidazo[4,5-b]quinoxalin-2(3H)-ylidene) ethylidene]-3-phenyl-2-isoxazolin-5-one

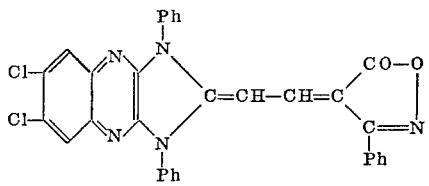

A mixture of 5.3 g. (1 mol.) of 6,7-dichloro-2-methyl-1,3-diphenylimidazo[4,5-b]quinoxalinium iodide, 2.7 g.

(1 mol.) of 4-anilinomethylene-3-phenyl-2-isoxazolin-5-one, 20 ml. of acetic anhydride, and 2 g. (2 mols.) of triethylamine was refluxed 15 minutes. After chilling, the crude dye was collected on a filter and washed with acetic anhydride. The dye was purified by dissolving in pyridine and precipitating with methyl alcohol. A 79% yield of pure dye was obtained as dark brown crystals, M.P. >320°.

Example 51.—6,7-dichloro-2-[2-(2-methyl-5-oxo-3-phenyl-3-isoxazolin-4-yl)vinyl]-1,3 - diphenylimidazo[4,5-b]quinoxalinium methylsulfate

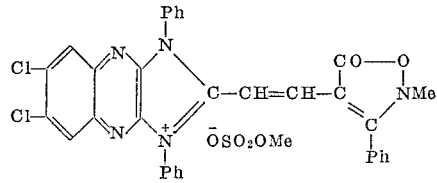

A mixture of 1.45 g. (1 mol.) of 4-[(6,7-dichloro-1,3-diphenylimidazo[4,5-b]quinoxalin - 2(3H) - ylidene)ethylidene]-3-phenyl-2-isoxazolin-5-one and 5 g. of dimethylsulfate was heated over a free flame with stirring. After the solid dissolved, the mixture was refluxed for one minute. After cooling, 20 ml. of acetone were added and the mixture chilled. The dye was collected on a filter and washed very thoroughly with acetone. A 51% yield of a brownish powder was obtained, M.P. 274–275° dec.

Example 52.—Anhydro-6,7-dichloro-2-{2-[5-oxo-3-phenyl-2-(3-sulfopropyl)-3-isoxazolin - 4 - yl]}vinyl-1,3-diphenylimidazo[4,5-b]quinoxalinium hydroxide

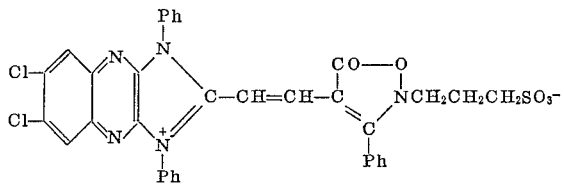

A mixture of 1.45 g. (1 mol.) of 4-[(6,7-dichloro-1,3-diphenylimidazo[4,5-b]quinoxalin-2(3H) - ylidene)ethylidene-3-phenyl-2-isoxazolin-5-one and 6 g. propane sultone was heated to around 180° when all the material goes into solution. The mixture was heated at 180–200° for two minutes. After cooling, 125 ml. of acetone was added and the mixture was chilled. After chilling overnight, the dye was collected on a filter and washed thoroughly with acetone. A 40% yield of an orange powder was obtained, M.P. 247–250° dec.

Example 53.—8,8',10,10' - tetraphenyl-8H-benzo[f]imidazo[4,5-b]quinoxalino-carbocyanine bromide

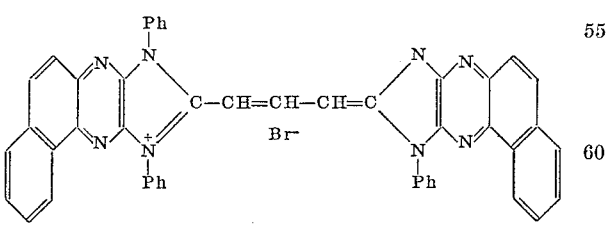

A mixture of 5.6 g. (2 mols.) of 9-methyl-8,10-diphenyl-8H - benzo[f]imidazo[4,5-b]quinoxalinium p-toluenesulfonate, 1.6 g. (1 mol. + 100% of excess) of diethoxymethyl acetate and 10 ml. of pyridine was refluxed 15 minutes. After chilling, the mixture was treated with ether and the solid which separated was collected on a filter and washed with ether. The crude dye was extracted with 250 ml. of methyl alcohol and the solution concentrated to 50 ml. After chilling, the mixture was filtered and the solid washed lightly with methyl alcohol and then discarded. The filtrate was treated with an aqueous solution of sodium bromide. After chilling, the dye was collected on a filter and washed with water. After recrystallization from methyl alcohol, 1.6 g. (37%) of pure dye was obtained as dark purplish crystals, M.P. 305–307° dec.

Example 54.—1',3,3'-trimethyl-8,10-diphenyl - 8H-benzo[f]imidazo[4,5-b]quinoxalino-indocarbocyanine iodide

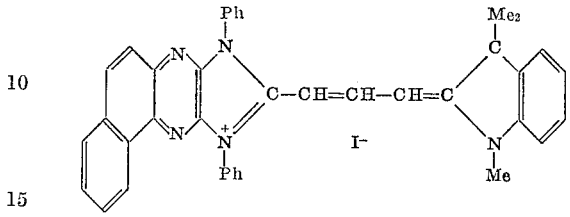

A mixture of 2.8 g. (1 mol.) of 9-methyl-8,10-diphenyl-benzo[f]imidazo[4,5-b]quinoxalinium p-toluenesulfonate, 2.2 g. (1 mol.) of 2-(2-acetanilidovinyl)-1,3,3-trimethylindolium iodide, 10 ml. of acetic anhydride and 0.5 g. (1 mol.) of triethylamine was refluxed ten minutes. After chilling, the crude dye was collected on a filter, washed with acetic anhydride and then with ether. After recrystallization from methyl alcohol, 1.1 g. (31%) of pure dye was obtained as green crystals with a bright reflex, M.P. 320–321° dec.

Example 55.—9-[2-(9-methyl - 3 - carbazolyl)vinyl]-8,10-diphenyl - 8H-benzo[f]imidazo[4,5-b]quinoxalinium p-toluenesulfonate

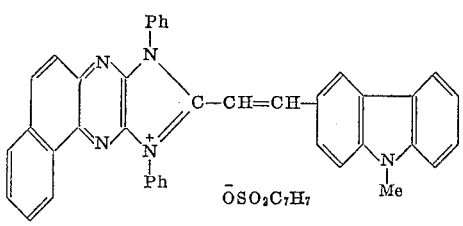

A mixture of 2.8 g. (1 mol.) of 9-methyl-8,10-diphenyl - 8H - benzo[f]imidazo[4,5-b]quinoxalinium p-toluenesulfonate, 1.1 g. (1 mol.) of 9-methylcarbazole-3-carboxaldehyde and 10 ml. of acetic anhydride was refluxed 15 minutes. After chilling, the reaction mixture was treated with ether and the crude dye collected on a filter and washed with ether. After recrystallization from methyl alcohol, 0.6 g. (16%) of pure dye was obtained as dark crystals, M.P. 215–218° dec.

Example 56.—9-[2-(1-methyl-2-phenyl-3 - indolyl)vinyl]-8,10-diphenyl - 8H-benzo[f]imidazo[4,5-b]quinoxalinium bromide

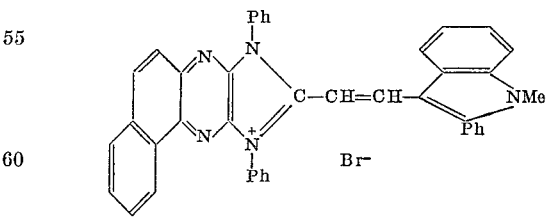

A mixture of 2.8 g (1 mol.) of 9-methyl-8,10-diphenyl-8H - benzo[f]imidazo[4,5-b]quinoxalinium p-toluenesulfonate, 1.2 g. (1 mol.) of 1-methyl-2-phenylindole-3-carboxaldehyde and 10 ml. of acetic anhydride was refluxed 15 minutes. After chilling, the reaction mixture was treated with ether and the crude dye which separated was collected on a filter and washed with ether. The crude dye was dissolved in ethyl alcohol and treated with an aqueous solution of sodium bromide. After chilling, the dye was collected on a filter and washed with water. After recrystallization from methyl alcohol, 0.7 g. (21%) of pure dye was obtained as dark crystals, M.P. >310° dec.

Example 57.—9-p-dimethylaminostyryl-8,10-diphenyl-
8H-benzo[f]imidazo[4,5-b]quinoxalinium bromide

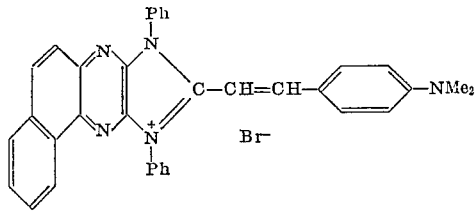

A mixture of 2.8 g. (1 mol.) of 9-methyl-8,10-diphenyl-
8H - benzo[f]imidazo[4,5-b]quinoxalinium p-toluenesul-
fonate, 1 g. (1 mol.+33% excess) of p-dimethylamino-
benzaldehyde and 10 ml. of acetic anhydride was refluxed
15 minutes. After chilling, the crude dye was collected
on a filter and washed with acetic anhydride and then
acetone. The crude dye was dissolved in ethyl alcohol
and the solution treated with an aqueous solution of
sodium bromide. After chilling, the dye was collected on
a filter and washed with water and then acetone. After
rcerystallization from ethyl alcohol, 0.7 g. (28%) of pure
dye was obtained as green crystals, M.P. 262–263° dec.

Example 58.—6,6′-dinitro-1,1′,3,3′-tetraphenylimidazo-
[4,5-b]quinoxalino p-toluenesulfonate

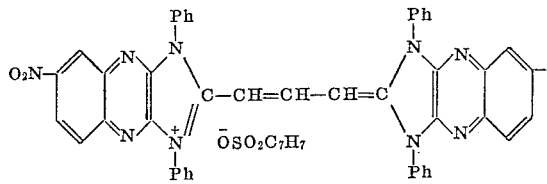

A mixture of 5.5 g. (2 mols.) of 2-methyl-6-nitro-1,3-
diphenylimidazo[4,5-b]quinoxalinium p-toluenesulfonate,
10 ml. of pyridine and 1.6 g. (1 mol.+100% excess) of
diethoxymethyl acetate was refluxed 30 seconds. After
chilling, the crude dye was collected on a filter, washed
well with acetone and dried. After recrystallization from
methyl alcohol, 2.2 g. (47%) of pure dye was obtained
as green crystals, M.P. 206–207° dec.

Example 59.—1,3-diallyl-6′-nitro-1′,3′-diphenylimidazo-
[4,5-b]quinoxalino carbocyanine p-toluenesulfonate

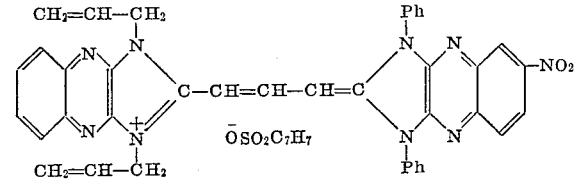

A mixture of 2.8 g. (1 mol.) of 2-methyl-6-nitro-1,3-
diphenylimidazo[4,5-b]quinoxalinium p-toluenesulfonate,
1.5 g. (1 mol.) of 1,3-diallyl-2-formyl-methylene-2,3-
dihydroimidazo[4,5-b]quinoxaline and 20 ml. of acetic
anhydride was refluxed 5 minutes. After chilling, the
crude dye was collected on a filter and washed with a
small amount of acetic anhydride and then with acetone.
After recrystallization from acetic anhydride, 0.9 g.
(22%) of pure dye was obtained as fine green crystals,
M.P. 180–183° dec.

Example 60.—3′-ethyl-6,6′-dinitro-1,3-diphenylimidazo-
[4,5-b]quinoxalinothiacarbocyanine p-toluenesulfonate

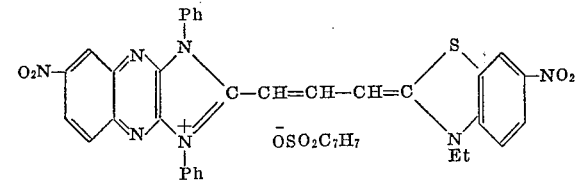

A mixture of 2.8 g. (1 mol.) of 2-methyl-6-nitro-1,3-
diphenylimidazo[4,5-b]quinoxalinium p-toluenesulfonate,
1.25 g. (1 mol.) of 3-ethyl-2-formylmethylene-6-nitro-
benzothiazoline and 20 ml. of acetic anhydride was
refluxed 5 minutes. After chilling, the crude dye was
collected on a filter and washed first with acetic anhydride
and then with acetone. After recrystallization from methyl
alcohol, 2.2 g. (57%) of pure dye was obtained as green
crystals with a bright reflex, M.P. 250–252° dec.

Example 61.—1′,3′,3′-trimethyl-6-nitro-1,3-diphenyl-
imidazo[4,5-b]quinoxalino-indocarbocyanine iodide

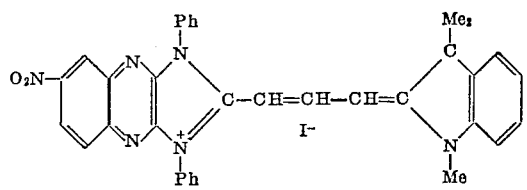

A mixture of 2.8 g. (1 mol.) of 2-methyl-6-nitro-1,3-
diphenylimidazo[4,5-b]quinoxalinium p-toluenesulfonate,
2.2 g. (1 mol.) of 2-(2-acetanilidovinyl)-1,3,3-trimethyl-
3H-indolium iodide, 20 ml. of acetic anhydride and 0.5
g. (1 mol.) of triethylamine was refluxed three minutes.
After chilling, the crude dye was collected on a filter and
washed with acetone. After recrystallization from methyl
alcohol, 1.1 g. (31%) of pure dye was obtained as dark
crytsals with a shiny reflex, M.P. 285–286° dec.

Example 62.—2 - [2 - (9-methyl-3-carbazolyl)vinyl]-6-
nitro - 1,3 - diphenylimidazo[4,5-b]quinoxalinium p-
toluenesulfonate

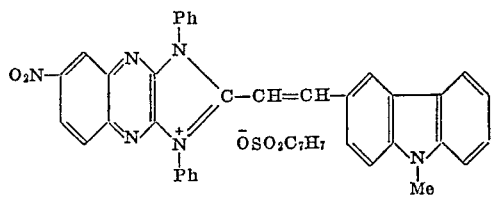

A mixture of 2.8 g. (1 mol.) of 2-methyl-6-nitro-1,3-
diphenylimidazo[4,5-b]quinoxalinium p-toluenesulfonate,
1.1 g. (1 mol.) of 9-methylcarbazole-3-carboxaldehyde
and 20 ml. of acetic anhydride was refluxed three minutes.
After chilling, the crude dye was collected on a filter and
washed first with acetic anhydride and then with acetone.
After recrystallization from methyl alcohol, 1.8 g. (42%)
of pure dye was obtained as dark reddish crystals, M.P.
291–292° dec.

Example 63.—2-[2-(1-methyl-2-phenyl-3-indolyl)vinyl]-
6 - nitro - 1,3 - diphenylimidazo[4,5-b]quinoxalinium
p-toluenesulfonate

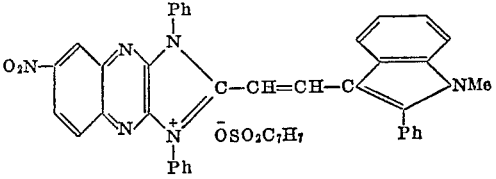

A mixture of 2.8 g. (1 mol.) of 2-methyl-6-nitro-1,3-
diphenylimidazo[4,5-b]quinoxalinium p-toluenesulfonate,
1.2 g. (1 mol.) of 1-methyl-2-phenylindole-3-carboxalde-
hyde and 20 ml. of aceitc anhydride was refluxed three
minutes. After chilling, the crude dye was collected on a
filter and washed first with acetic anhydride and then
with acetone. After recrystallization from ethyl alcohol,
1.9 g. (49%) of pure dye was obtained as dark crystals
with a shiny reflex, M.P. 303–304° dec.

Example 64.—2-p-dimethylaminostyryl-6-nitro-1,3-diphenylimidazo[4,5-b]quinoxalinium p-tolenesulfonate

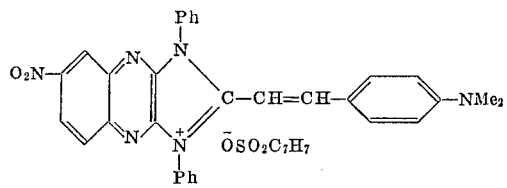

A mixture of 2.8 g. (1 mol.) of 2-methyl-6-nitro-1,3-diphenylimidazo[4,5-b]quinoxalinium p-toluenesulfonate, 1 g. (1 mol.+33% excess) of p-dimethylaminobenzaldehyde and 20 ml. of acetic anhydride was refluxed five minutes. After chilling, the crude dye was collected on a filter and washed, first with acetic anhydride and then with acetone. After recrystallization from methyl alcohol, 2.0 g. (55%) of pure dye was obtained as dark crystals with a coppery reflex, M.P. 257–258° dec.

Intermediates useful in preparing the dyes of Examples 37 through 64 are shown in Examples 65 through 74, below.

Example 65.—6-chloro-2,3-dihydroxyquinoxaline

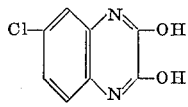

A mixture of 71.5 g. (1 mol) of 4-chloro-o-phenylenediamine and 675 ml. of ethyl oxalate was refluxed one hour and then the alcohol formed allowed to distill over slowly. After all of the alcohol had distilled, the reaction mixture was chilled and the solid collected on a filter. The solid was suspended in 800 ml. of methyl alcohol and then collected on a filter. The solid was again suspended in 800 ml. of methyl alcohol and collected on a filter. A yield of 86 g. (88%) of finely divided solid was obtained, M.P. >300°.

Example 66.—2,3,6-trichloroquinoxaline

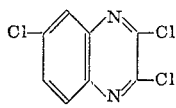

To a suspension of 98 g. (1 mol) of 6-chloro-2,3-dihydroxyquinoxaline in 200 ml. of phosphoryl chloride, was added 208 g. (2 mols) of phosphorus pentachloride. The mixture was heated until the internal temperature was 80° whereupon a vigorous evolution of hydrogen chloride took place. When the reaction slowed, the temperature was slowly raised to 118° over a period of one hour. The phosphoryl chloride was allowed to distill and about 275 ml. collected. The residue was poured into 2 l. of ice and water with stirring. The mixture was neutralized with a solution of sodium carbonate and the solid collected on a filter. The solid was extracted with 600 ml. of boiling benzene, separating the benzene from the water layer before cooling. On chilling, 80.5 g. (69%) of gray crystals were obtained, M.P. 143–144°. A second crop of 27 g. (23%) was obtained from the benzene filtrate, M.P. 143–144°.

Example 67.—6 - chloro - 2 - methyl - 1,3 - diphenylimidazo[4,5-b]quinoxalinium-p-toluenesulfonate

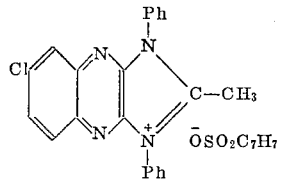

A mixture of 23.4 g. (1 mol.) of 2,3,6-trichloroquinoxaline and 40 g. (4 mols.) of aniline was heated 30 minutes on a steam bath when all the material dissolved. After heating for an additional 1½ hours, the mixture was stirred with 400 ml. of water and the solid collected on a filter. The solid was dissolved in 250 ml. of ethyl alcohol, cooled and filtered and the filtrate treated with water. The heavy oil was separated from the water by decantation and then dissolved in 300 ml. of ether. The solution was dried and the ether removed. The residue was dissolved in 150 ml. of acetic anhydride and 19 g. (1 mol.) of p-toluenesulfonic acid and the solution refluxed 1½ hours. After chilling, the mixture was treated with 2 l. of ether and the oil which separated washed with additional ether. The oil was stirred with 150 ml. of acetone and the material becomes crystalline. After chilling, the solid was collected on a filter and washed with acetone. A yield of 37 g. (68%) of gray crystals was obtained, M.P. 278–280° dec.

*Analysis.*—Calc'd for $C_{29}H_{23}ClN_4O_3S$: C, 64.1; H, 4.3. Found: C, 64.4; H, 4.3.

Example 68.—1,3 - diallyl - 6 - chloro - 2 - methylimidazo[4,5-b]quinoxalinium-p-toluenesulfonate

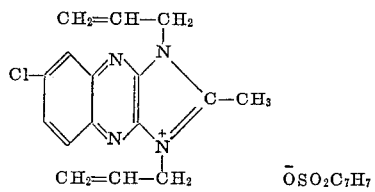

To 34.2 g. (4 mols. +50% excess of allylamine was added 23.4 g. (1 mol.) of 2,3,6-trichloroquinoxaline in small portions with shaking. After the addition was complete, the mixture was heated on a steam bath for two hours. The reaction mixture was stirred with 200 ml. of water and the water layer decanted. The oil was dissolved in 400 ml. of benzene and the benzene solution washed with water. After removing the benzene, the residue was dissolved in 150 ml. of acetic anhydride and 19 g. (1 mol.) of p-toluenesulfonic acid, and the mixture refluxed two hours. After chilling, the mixture was stirred twice with 2 l. of ether. The residue was stirred with 150 ml. of acetone and the solution chilled. After chilling, 14.4 g. (33%) of colorless crystals were obtained, M.P. 173–175° dec.

*Analysis.*—Calc'd for $C_{23}H_{23}ClN_4O_3S$: C, 58.6; H, 4.9; N, 11.9. Found: C, 58.9; H, 4.9; N, 12.0.

Example 69.—6,7-dichloro-2,3-dihydroxyquinoxaline

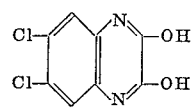

A mixture of 50 g. (1 mol.) of 4,5-dichloro-o-phenylenediamine and 380 ml. of ethyl oxalate was refluxed ½ hour and then the alcohol formed allowed to distill slowly over a period of two hours. After chilling, the solid was collected on a filter. The solid was suspended in 500 ml. of methyl alcohol and then collected on a filter. After repeating this washing, a yield of 57.6 g. (88%) of brownish powder was obtained, M.P. >320°.

Example 70.—2,3,6,7-tetrachloroquinoxaline

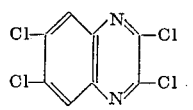

A mixture of 57.6 g. (1 mol.) of 6,7-dichloro-2,3-dihydroxyquinoxaline, 140 ml. of phosphoryl chloride and 104 g. (2 mols.) of phosphorus pentachloride was refluxed for four hours. After chilling, the solid was collected on a filter and then suspended in 500 ml. of ice and water, collected on a filter and washed with water. A yield of 51.1 g. (76%) of light tan powder was obtained, M.P. 170–171°.

Example 71.—2,3-dianilino-6,7-dichloroquinoxaline

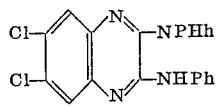

A mixture of 51.1 g. (1 mol.) of 2,3,6,7-tetrachloroquinoxaline and 79 ml. (4 mols.) of aniline was heated on a steam bath for two hours. The solid was ground in a mortar and then boiled with 400 ml. of methyl alcohol. After chilling, the solid was collected on a filter, washed with methyl alcohol, then stirred with 400 ml. of water, collected on a filter and washed with water. A yield of 66.3 g. (91%) of a tan solid was obtained, M.P. 195–200°.

Example 72.—6,7 - dichloro - 2 - methyl - 1,3 - diphenylimidazo[4,5-b]quinoxalinum-p-toluenesulfonate

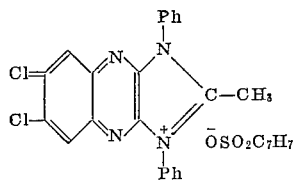

A mixture of 66.3 g. (1 mol.) of 2,3-dianilino-6,7-dichloroquinoxaline, 280 ml. of acetic anhydride and 33 g. (1 mol.) of p-toluenesulfonic acid was refluxed 1½ hours. The reaction mixture was cooled and treated with 2½ l. of ether. The ether was decanted from an oil which was washed five times more with 150 ml. portions of ether. The residue was stirred with 100 ml. of pyridine, and the very finely divided product collected on a filter. The solid was washed well with acetone. A yield of 47 g. (47%) of yellow powder was obtained, M.P. 210–245°.

Example 73.—2,3-dihydroxybenzo[f]quinoaxiline

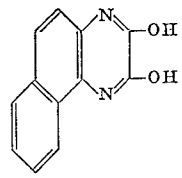

A mixture of 100 g. (1 mol.) of 1,2-naphthalenediamine and 1 kg. of ethyl oxalate was refluxed for 30 minutes and then the alcohol formed allowed to distill slowly over a period of two hours. After chilling, the solid was collected on a filter. The solid was suspended in 600 ml. of methyl alcohol, and then collected on a filter. After repeating this washing, a yield of 112 g. (83%) of brown solid was obtained, M.P. >320°.

Example 74.—2,3-dichlorobenzo[f]quinoxaline

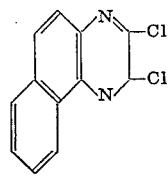

A mixture of 42.4 g. (1 mol.) of 2,3-dihydroxybenzo[f]quinoxaline, 200 ml. of phosphoryl chloride and 83.2 g. (2 mols.) of phosphorus pentachloride was refluxed three hours. After chilling, the solid was collected on a filter and then stirred with ice and water and collected on a filter again. The filtrate was poured into 1 l. of ice and water and the solid collected on a filter. The solids were combined, 48.8 g. (97%) and used without further purification.

Example 75.—9-methyl-8,10-diphenyl - 8H - benz[f]imidazo[4,5-b]quinoxalinium p-toluenesulfonate

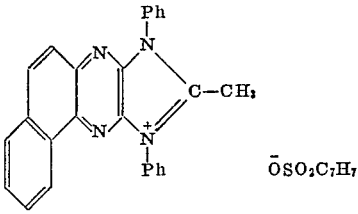

A mixture of 48.8 g. (1 mol.) of 2,3-dichlorobenzo[f]quinoxaline and 150 ml. of aniline was refluxed 2½ hours. After chilling, the reaction mixture was washed three times with petroleum ether. The residue was treated with 450 ml. of methyl alcohol. After chilling, 30 g. of solid was collected on a filter. The filtrate was concentrated to dryness and the residue steam distilled until no more aniline was obtained. The oil which remained solidified on cooling. The solidified oil was dissolved in 150 ml. of acetic anhydride and 18 g. p-toluenesulfonic acid and the mixture refluxed two hours. After chilling, the mixture was filtered to remove unreactive solid. The filtrate was treated with 2 l. of ether and the oil which separated washed with ether. The residual oil was dissolved in ethyl alcohol and the solution chilled and filtered. The solid which was collected on a filter was unreactive. The filtrate was treated with ether, and the oil stirred several times with fresh ether until crystalline. The solid was collected on a filter. A yield of 36.5 g. (48%) of brown solid was obtained from which dyes could be obtained.

Example 76.—2,3-dihydroxy-6-nitroquinoxaline

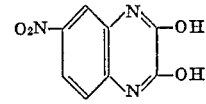

A mixture of 100 g. (1 mol.) of 4-nitro-o-phenylenediamine and 1 kg. of ethyl oxalate was refluxed for one hour and then the alcohol formed allowed to distill over slowly. After all of the alcohol had distilled, the reaction mixture was chilled and the solid collected on a filter. The solid was suspended in 400 ml. of methyl alcohol and collected on a filter. After repeating this washing, a yield of 75 g. (60%) of brownish yellow solid was obtained, M.P. >320°.

Example 77.—2,3-dichloro-6-nitroquinoxaline

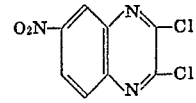

A mixture of 38.2 g. (1 mol.) of 2,3-dihydroxy-6-nitroquinoxaline and 200 ml. of phosphoryl chloride and 83.2 g. (2 mols.) of phosphorus pentachloride was refluxed 1½ hours. After chilling, the solid was collected on a filter and then suspended in 500 ml. of ice and water and filtered again. A yield of 24.5 g. (50%) of tan solid was obtained, M.P. 252–253° dec.

Example 78.—2-methyl-6-nitro - 1,3 - diphenylimidazo[4,5-b]quinoxalinium p-toluenesulfonate

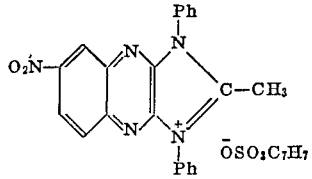

A mixture of 24.5 g. (1 mol.) of 2,3-dichloro-6-nitroquinoxaline and 37.2 g. (4 mols.) of aniline was heated two hours on a steam bath. To the cooled reaction mixture was added 200 ml. of acetic anhydride and 19 g. (1 mol.) of p-toluenesulfonic acid and the mixture refluxed 1½ hours. After chilling, the mixture was treated with two liters of ether and the separated oil washed with ether. The solid which formed was collected on a filter and then suspended in acetone and collected on a filter again. A yield of 42.5 g. (77%) of tan crystals was obtained, M.P. 284–285° dec.

*Analysis.*—Calc'd. for $C_{29}H_{23}N_5O_5S$: C, 62.9; H, 4.2; N, 12.6. Found: C, 62.8; H, 4.1; N, 12.7.

The cyanine dyes containing a substituted imidazo-[4,5-b]quinoxaline nucleus, such as those of Examples 37–64, are highly useful spectrally sensitizing electron acceptors in direct positive emulsions. Dyes containing a nitro, chloro or dichloro substituted imidazo[4,5-b]quinoxaline nucleus are especially useful in direct positive emulsions. The chloro (e.g., monochloro and dichloro) substituted dyes are preferred. Such dyes are characterized by especially sharp adsorption peaks. Direct positive emulsions containing them have enhanced speed.

For the preparation of photographic emulsions, the new dyes of the invention are advantageously incorporated in the finished silver halide emulsion and should, of course, be uniformly distributed throughout the emulsion. The methods of incorporating dyes in emulsions are relatively simple and well known to those skilled in the art of emulsion making. For example, it is convenient to add the dyes from solutions in appropriate solvents, in which the solvent selected should have no deleterious effect on the ultimate light-sensitive materials. Methanol, isopropanol, pyridine, etc., alone or in combination have proven satisfactory as solvents for the majority of our new dyes. The type of silver halide emulsions that are desensitized with our dyes include any of those prepared with hydrophilic colloids that are known to be satisfactory for dispersing light-sensitive silver halides, for example, emulsions prepared with hydrophilic colloids, such as, natural materials, e.g., gelatin, albumin, agar-agar, gum arabic, alginic acid, etc., and synthetic hydrophilic resins, e.g., polyvinyl alcohol, polyvinyl pyrrolidone, cellulose ethers, partially hydrolyzed cellulose acetate, etc.

The concentration of our new dyes in the emulsion can be widely varied, i.e., generally from about 10 to about 200 mg. per mole of silver halide. The specific concentration will vary according to the type of light-sensitive material in the emulsion and according to the effects desired. The most advantageous dye concentration for any given emulsion can be readily determined by making the tests and observations customarily used in the art of emulsion making. Our emulsions are coated to advantage on any of the support materials used for photographic elements, for example, paper, glass, cellulose derivatives, such as cellulose acetate, cellulose acetate-propionate, cellulose nitrate, etc., synthetic resins, such as polystyrene, polyethylene terephthalate and other polyesters, polyamides, such as nylon, and the like.

To prepare a gelatino-silver halide emulsion desensitized with one of our new dyes, the following procedure is satisfactory: A quantity of the dye is dissolved in a suitable solvent, and a volume of this solution containing the desired amount of dye is slowly added with intimate mixing to about 1,000 cc. of light sensitive gelatino-silver halide emulsion. With most of our dyes, from about 1 to 20 mg. of dye per liter of emulsion suffices to produce the desired desensitizing effect with the ordinary light-sensitive gelatino-silver bromide (including bromoiodide and chlorobromide) and fine-grain emulsions which include most of the ordinary employed light-sensitive gelatino-silver chloride emulsions. Somewhat smaller or even larger concentrations of dye may be necessary to secure the desired degree of desensitization. While the preceding has dealt with emulsions comprising gelatin, it will be understood that these remarks apply generally to any emulsions in which a part or all of the gelatin is substituted by another suitable hydrophilic colloid such as previously mentioned.

The above statements are only illustrative and are not to be understood as limiting our invention in any sense, as it will be apparent that our dyes can be incorporated by other methods in many of the emulsions customarily used in the art. For instance, in a less preferred method, the dyes can be incorporated by bathing a plate or film bearing an emulsion, in a solution of the dye.

Our invention is still further illustrated by the following tabulation showing the relative speed data and percent desensitization produced in a gelatin-silver bromoiodide emulsion and in a gelatino-silver chlorobromide emulsion by representative dyes of our invention. The dyes, dissolved in suitable solvents, were added to separate portions of the emulsions at the concentrations indicated. After digestion at 50° C. for 10 minutes, the emulsions were coated on a cellulose acetate film support. A control coating was made of each emulsion containing no dye. A sample of each coatings was exposed with a sensitometer to a light source modulated with Wratten #35 and #38A filters. The exposed film strips were developed in a conventional developer having the formula:

|  | Grams |
| --- | --- |
| p-Methylaminophenol sulfate | 2.0 |
| Sodium sulfite, desiccated | 90.0 |
| Hydroquinone | 8.0 |
| Sodium carbonate, monohydrated | 52.5 |
| Potassium bromide | 5.0 |
| Water to make 1 liter. | |

The developed strips were then fixed with a conventional fixing bath, washed and dried. From densitometric measurements the relative speeds were determined for each sample based on an arbitrary value of 100 for each of the two controls. The data obtained are tabulated below.

| Dye of example No. | Dye concentration g./mole silver halide | Type of emulsion | Relative speed | Percent desensitization |
| --- | --- | --- | --- | --- |
| 1 | .04 | Silver bromoiodide | 20 | 80 |
| 2 | .02 | do | 9 | 91 |
| 3 | .08 | do | 50 | 50 |
| 4 | .08 | do | 32 | 68 |
| 5 | .08 | do | 18 | 82 |
| 6 | .08 | do | 50 | 50 |
| 7 | .08 | do | 22 | 78 |
| 8 | .04 | do | 18 | 82 |
| 9 | .04 | do | 50 | 50 |
| None | | do | 100 | |
| 1 | .06 | Silver chlorobromide | 7 | 93 |
| 2 | .03 | do | 7 | 93 |
| 3 | .13 | do | 35 | 65 |
| 4 | .07 | do | 25 | 75 |
| 5 | .07 | do | 9 | 91 |
| 6 | .13 | do | 40 | 60 |
| 7 | .07 | do | 25 | 75 |
| 8 | .07 | do | 50 | 50 |
| 9 | .07 | do | 56 | 44 |
| None | | do | 100 | |

The silver bromoiodide emulsion contained 2 mole percent iodide and 98 mole percent bromide. The silver chlorobromide emulsion contained 80 mole percent chloride and 20 mole percent bromide. From the data it can be seen that representative dyes of our invention desensitize up to 93% under the conditions used. Similarly it can be shown that other dyes of our invention are valuable desensitizers for photographic silver halide emulsions. Although gelatino-silver halide emulsions were used for illustrative purposes, it is to be understood that our desensitizers are also used to advantage in emulsions in which gelatin is replaced by hydrophilic colloids mentioned previously as gelatin substitutes.

Our desensitizing dyes are employed to advantage in photographic elements where desensitization is required, for example, in making photographic silver halide emulsions used for the direct production of positive images, such as are described by Kendall et al. U.S. Patent 2,541,472, issued Feb. 13, 1951, Kendall et al. U.S. Patent 2,669,515, issued Feb. 16, 1954, Hillson U.S. Patent 3,062,651, issued Nov. 6, 1962, British Patent 723,019, 1955, etc.

Solutions of Dyes 1, 3, 4, 5, 6, 7 and 8 were bleached by the developer solution described previously, indicating that they have utility at bleachable filter dyes for photographic elements.

Our dyes are also used to advantage as biological stains.

The invention has been described in detail with particular reference to preferred embodiments thereof but it will be understood that variations and modifications can be effected within the spirit and scope of the invention as described hereinabove and as defined in the appended claims.

We claim:

1. A light-sensitive photographic silver halide emulsion containing a dye selected from those having one of the following formulas:

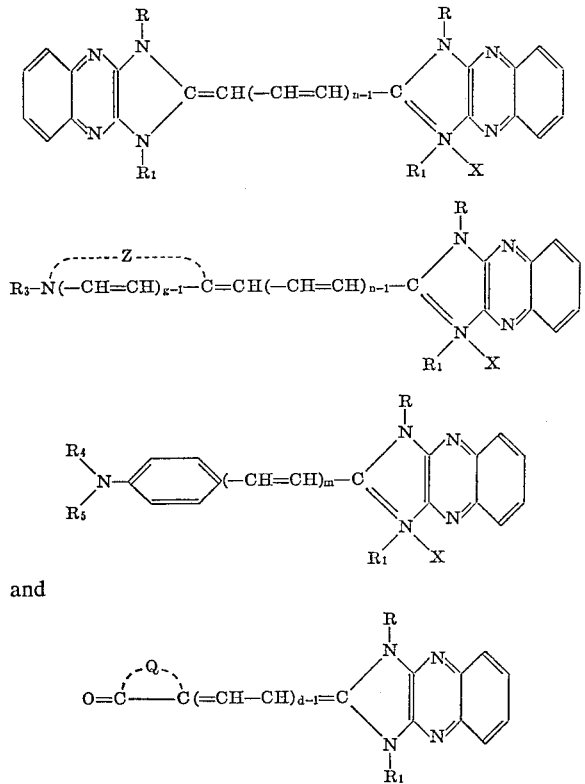

and wherein $n$ represents a positive integer of from 1 to 4, $m$ and $g$ each represents a positive integer of from 1–2, $d$ represents a positive integer of from 1 to 3, R and $R_1$ each represents a member selected from the group consisting of an acyclic hydrocarbon substituent, an alkaryl substituent and an aryl substituent, $R_3$ represents an alkyl group of from 1–12 carbon atoms, $R_4$ and $R_5$ each represents an alkyl group of from 1–6 carbons atoms, X represents an acid anion, Z represents the non-metallic atoms required to complete a heterocyclic nucleus containing from 5 to 6 atoms in the heterocyclic ring, and Q represents the non-metallic atoms required to complete a heterocyclic nucleus containing from 5 to 6 atoms in the heterocyclic ring.

2. A light-sensitive photographic silver halide emulsion in accordance with claim 1 wherein the desensitizing dye is 1,1',3,3'-tetraethylimidazo[4,5-b]quinoxalinocarbocyanine chloride.

3. A light-sensitive photographic silver halide emulsion in accordance with claim 1 wherein the desensitizing dye is 1,3,3'-triethylimidazo[4,5-b]quinoxalino-oxacarbocyanine iodide.

4. A light-sensitive photographic silver halide emulsion in accordance with claim 1 wherein the desensitizing dye is 1,3,3'-triethylimidazo[4,5-b]quinoxalino-thia-carbocyanine iodide.

5. A light-sensitive photographic silver halide emulsion in accordance with claim 1 wherein the desensitizing dye is 2 - p - dimethylaminostyryl-1,3-diethylimidazo[4,5-b]-quinoxalinium iodide.

6. A light-sensitive photographic silver halide emulsion in accordance with claim 1 wherein the desensitizing dye is 5-[(1,3-diethylimidazo[4,5-b]quinoxalin-2-ylidene]-1,3-diethyl-2-thiobarbituric acid.

7. A light-sensitive photographic element comprising a support having coated thereon at least one layer of the photographic emulsion of claim 1.

8. A light-sensitive photographic silver halide emulsion containing a cyanine dye salt which comprises two nuclei joined together by methine linkage, at least one of said nuclei being an imidazo (4,5-b)quinoxaline nucleus, said nucleus being joined through the 2-carbon atom thereof to said methine linkage, and a second nucleus to complete said cyanine dye.

9. A light-sensitive photographic silver halide emulsion in accordance with claim 8 wherein said second nucleus contains a heterocyclic nitrogen atom, and the methine linkage is part of a polyene chain containing an equal number of alternating single and double bonds, one terminal carbon atom of said chain being the 2-carbon atom of an imidazo(4,5-b)quinoxaline nucleus, the other terminal carbon atom of said chain being in said second nucleus and attached to said heterocyclic nitrogen atom.

10. A light-sensitive photographic silver halide emulsion containing a merocyanine dye which comprises two nuclei joined together through an acyclic methine group which is part of a polyene chain containing an equal number of alternating single and double bonds, one of the terminal atoms of said chain being the 2-carbon atom of an imidazo(4,5-b)quinoxaline nucleus, and the other terminal carbon atom of said polyene chain being in a second heterocyclic ring and attached to an extracyclic carbonylic oxygen atom.

11. A light-sensitive photographic silver halide emulsion containing a styryl dye which comprises an imidazo (4,5-b)quinoxoline nucleus joined to a para-alkylamino benzene ring through an acyclic polyene chain containing an equal number of single and double bonds, one terminal atom of said chain being the 2-carbon atom of said imidazo(4,5-b)quinoxaline nucleus, the other terminal carbon atom being in said benzene ring and attached to the nitrogen atom of said para-alkylamino group.

12. A light-sensitive photographic silver halide emulsion in accordance with claim 8 wherein said dye is a cyanine dye comprising two imidazo(4,5-b)quinoxaline nuclei joined together through a polyene chain containing an equal number of alternating single and double bonds, the terminal carbon atom of said chain being the 2-carbon atom, respectively, of said imidazo(4,5-b)quinoxaline nuclei.

13. A light-sensitive photographic silver halide emulsion in accordance with claim 9 wherein said second nucleus is a desensitizing nucleus.

14. A light-sensitive photographic silver halide emulsion in accordance with claim 12 wherein said polyene chain is composed of 5 carbon atoms.

15. A silver halide emulsion containing a dye selected from the group consisting of 1,1',3,3'-tetraethylimidazo[4,5-b]quinoxalinocarbocyanine chloride;
1,1',3,3'-tetraethylimidazo[4,5-b]quinoxalinodicarbocyanine chloride;
1,3,3'-triethylimidazo[4,5-b]quinoxalino-oxacarbocyanine iodide;
1,3,3'-triethylimidazo[4,5-b]quinoxalino-thiacarbocyanine iodide;
1,3-diethyl-1',3',3'-trimethylimidazo[4,5-b]quinoxalino-indocarbocyanine iodide;
1,3-diethyl-3'-methylimidazo[4,5-b]quinoxalino-thiazolino-carbocyanine iodide;
1,1',3-triethylimidazo[4,5-b]quinoxalino-2'-carbocyanine iodide;

2-p-dimethylaminostyryl-1,3-diethylimidazo[4,5-b]-
quinoxalinium iodide;
5-[(1,3-diethylimidazo[4,5-b]quinoxalin-2-ylidene)-
ethylidene]-3-ethylrhodanine;
5-[(1,3-diethylimidazo[4,5-b]quinoxalin-2-ylidene)ethyl-
idene]-1,3-diethyl-2-thiobarbituric acid;
1,1',3,3'-tetra(2-hydroxyethyl)imidazo[4,5-b]quinoxalino
carbocyanine iodide;
1,3-di(2-hydroxyethyl)-1',3',3'-trimethylimidazo[4,5-b]-
quinoxalino-indocarbocyanine iodide;
2-p-dimethylaminostyryl-1,3-di(2-hydroxyethyl)imidazo
[4,5-b]quinoxalinium p-toluenesulfonate;
1,1',3,3'-tetraallylimidazo[4,5-b]quinoxalinocarbo-
cyanine p-toluenesulfonate;
1,3-diallyl-3'-ethylimidazo[4,5-b]quinoxalino-oxacarbo-
cyanine iodide;
1,3-diallyl-3'-ethylimidazo[4,5-b]quinoxalinothiacarbo-
cyanine iodide;
1,3-diallyl-1',3',3'-trimethylimidazo[4,5-b]quinoxalino-
indocarbocyanine iodide;
1,3-diallyl-3'-ethyl-4',5'-benzoimidazo[4,5-b]quinoxalino
thiacarbocyanine p-toluenesulfonate;
1,3-diallyl-1'-ethylimidazo[4,5-b]quinoxalino-2'-car-
bocyanine iodide;
1,3-diallyl-2-p-dimethylaminostyrylimidazo[4,5-b]-
quinoxalinium p-toluenesulfonate;
5-[(1,3-diallylimidazo[4,5-b]quinoxalin-2(3H)-ylidene)-
ethylidene]-3-ethylrhodanine;
1,1',3,3'-tetraphenylimidazo[4,5-b]quinoxalinocarbo-
cyanine p-toluenesulfonate;
3'-ethyl-1,3-diphenylimidazo[4,5-b]quinoxalinothia-
cyanine iodide;
3'-ethyl-1,3-diphenylimidazo[4,5-b]quinoxalino-oxacar-
bocyanine iodide;
3'-ethyl-1,3-diphenylimidazo[4,5-b]quinoxalinothiacar-
bocyanine iodide;
1',3',3'-trimethyl-1,3-diphenylimidazo[4,5-b]quinoxalino-
indocarbocyanine iodide;
1'-ethyl-1,3-diphenylimidazo[4,5-b]quinoxalino-2'-car-
bocyanine iodide;
2-p-dimethylaminostyryl-1,3-diphenylimidazo[4,5-b]-
quinoxalinium-p-toluenesulfonate;
5-[(1,3-diphenylimidazo]4,5-b]quinoxalin-2(3H)-
ylidene)ethylidene]-3-ethylrhodanine.

16. A light-sensitive photographic silver halide emulsion as defined in claim 8 wherein said imidazo[4,5-b]-quinoxaline salt moiety contains at least one halogen substituent.

17. A light-sensitive photographic silver halide emulsion as defined in claim 8 wherein said imidazo[4,5-b]-quinoxaline nucleus is chloro-substituted.

18. A light-sensitive photographic silver halide emulsion as defined in claim 9 wherein said imidazo[4,5-b]-quinoxaline nucleus is chloro-substituted.

19. A light-sensitive photographic silver halide emulsion as defined in claim 13 wherein said imidazo[4,5-b]-quinoxaline nucleus is chloro-substituted.

20. A light-sensitive photographic silver halide emulsion as defined in claim 10 wherein said imidazo[4,5-b]-quinoxaline nucleus is chloro-substituted.

21. A light-sensitive photographic silver halide emulsion as defined in claim 11 wherein said imidazo[4,5-b]-quinoxaline nucleus is chloro-substituted.

22. A light-sensitive photographic silver halide emulsion as defined in claim 12 wherein at least one of said imidazo[4,5-b]quinoxaline nuclei is chloro-substituted.

23. A light-sensitive silver halide emulsion containing a dye selected from the group consisting of 6,6'-dichloro-1,1',3,3'-tetraphenylimidazo[4,5-b]quinoxa-
linocarbocyanine salt;
6-chloro-1',3',3'-trimethyl-1,3-diphenylimidazo[4,5-b]
quinoxalinoindocarbocyanine salt;
6-chloro-2-[(1-methyl-2-phenyl-3-indolyl)vinyl]-1,3-
diphenylimidazo[4,5-b]quinoxalinium salt;
6-chloro-2-[2-(9-methyl-3-carbazolyl)vinyl]1,3-diphenyl-
imidazo[4,5-b]quinoxalinium salt;
6-chloro-2-p-dimethylaminostyryl-1,3-diphenylimidazo
[4,5-b]quinoxalinium salt;
1,3-diallyl-6-chloro-2-[2-(1-methyl-2-phenyl-3-indolyl)-
vinyl]imidazo[4,5-b]quinoxalinium salt;
1,1',3,3',-tetraallyl-6,6'-dichloroimidazo[4,5-b]quinox-
alinocarbocyanine salt;
6,6',7,7'-tetrachloro-1,1',3,3'-tetraphenylimidazo[4,5-b]
quinoxalinocarbocyanine salt;
6,7-dichloro-1',3',3'-trimethyl-1,3-diphenylimidazo[4,5-b]
quinoxalino-indocarbocyanine salt;
6,7-dichloro-1'-ethyl-1,3-diphenylimidazo[4,5-b]quin-
oxalino-2'-carbocyanine salt;
6,7-dichloro-2-[2-(9-methyl-3-carbazolyl)-vinyl]-1,3-
diphenylimidazo[4,5-b]quinoxalinium salt;
6,7-dichloro-2-[2-(1-methyl-2-phenyl-3-indolyl)vinyl]-
1,3-diphenylimidazo[4,5-b]quinoxalinium salt;
6,7-dichloro-2-p-dimethylaminostyryl-1,3-diphenylimidazo
[4,5-b]quinoxalinium salt;
4-[(6,7-dichloro-1,3-diphenylimidazo[4,5-b]quinoxalin-
2(3H)-ylidene)ethylidene]-3-phenyl-2-isoxazolin-5-
one;
6,7-dichloro-2-[2-(2-methyl-5-oxo-3-phenyl-3-isoxazolin-
4-yl)vinyl]-1,3-diphenylimidazo[4,5-b]quinoxalinium
salt; and
anhydro-6,7-dichloro-2-{2-[5-oxo-3-phenyl-2-(3-sulfo-
propyl)-3-isoxazolin-4-yl]}vinyl-1,3-diphenylimidazo
[4,5-b]quinoxalinium salt.

References Cited

UNITED STATES PATENTS 2,954,376  9/1960  Nys et al. _____ 96—106

OTHER REFERENCES

Hinsberg et al.: vol 36. Berichte, pp. 4050–51 (1903).
Schipper et al.: JACS, vol. 73, pp. 5672–5 (1951).

NORMAN G. TORCHIN, Primary Examiner.

ALFONSO T. SUROPICO, Assistant Examiner.

U.S. Cl. X.R.

96—88

UNITED STATES PATENT OFFICE
CERTIFICATE OF CORRECTION

Patent No. 3,431,111                  March 4, 1969

Leslie G. S. Brooker et al.

It is certified that error appears in the above identified patent and that said Letters Patent are hereby corrected as shown below:

Column 1, line 39, "opparent" should read -- apparent --.
Column 6, lines 30 to 33, the formula should appear as shown below:

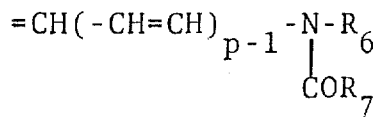

Column 7, lines 28 to 34, the right-hand portion of the formula should appear as shown below:

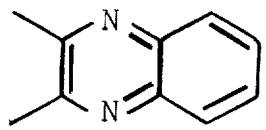

Column 11, line 42, "quinoxalinoethiacarbocyanine" should read -- quinoxalinothiacarbocyanine --. Column 14, line 64, "2-β-anilinovinyl-2-ethylquinolinium" should read -- 2-β-anilinovinyl-1-ethylquinolinium --. Column 18, lines 47 to 54, the right-hand portion of the formula should appear as shown below:

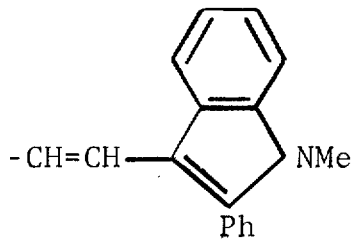

Column 19, lines 55 to 61, the formula should appear as shown below:

(2)

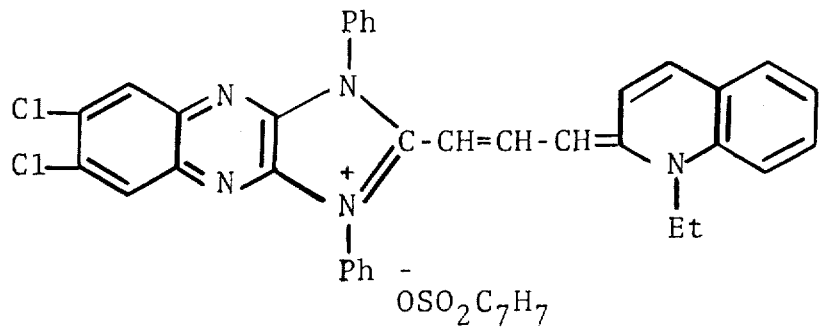

Column 21, line 5, after "in" insert -- pyridine and precipitating with methyl alcohol. A 79% yield of pure dye was obtained as dark brown crystals, M.P.>320°. --; lines 49 to 51, cancel "pyridine and precipitating with methyl alcohol. A 79% yield of pure dye was obtained as dark brown crystals, M.P.>320°.". Column 24, line 70, "aceitc" should read -- acetic --. Column 26, line 19, "1,3-dially-6-chloro-2-methylimidazo" should read -- 1,3-diallyl-6-chloro-2-methylimidazo --. Column 27, lines 2 to 6, that portion of the formula reading "-NPHh" should read -- -NHPh --. Column 31, line 1, "at" should read -- as --.

Signed and sealed this 21st day of April 1970.

(SEAL)
Attest:

EDWARD M.FLETCHER,JR.
Attesting Officer

WILLIAM E. SCHUYLER, JR.
Commissioner of Patents